United States Patent
Zhang

(10) Patent No.: US 12,531,655 B2
(45) Date of Patent: Jan. 20, 2026

(54) METHOD FOR PROCESSING BLUETOOTH DATA PACKET AND COMMUNICATION APPARATUS

(71) Applicant: HUAWEI TECHNOLOGIES CO., LTD., Guangdong (CN)

(72) Inventor: Chunqing Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 471 days.

(21) Appl. No.: 18/161,146

(22) Filed: Jan. 30, 2023

(65) Prior Publication Data

US 2023/0171028 A1 Jun. 1, 2023

Related U.S. Application Data

(63) Continuation of application No. PCT/CN2021/104555, filed on Jul. 5, 2021.

(30) Foreign Application Priority Data

Jul. 31, 2020 (CN) .......................... 202010763031.8

(51) Int. Cl.
  *H04L 1/00* (2006.01)
(52) U.S. Cl.
  CPC .......... *H04L 1/0057* (2013.01); *H04L 1/0042* (2013.01)
(58) Field of Classification Search
  CPC .................... H04L 1/0057; H04L 1/0042
  See application file for complete search history.

(56) References Cited

U.S. PATENT DOCUMENTS

| | | | |
|---|---|---|---|
| 2003/0069988 A1 | 4/2003 | Rune et al. | |
| 2015/0327001 A1* | 11/2015 | Kirshenberg | H04W 4/80 455/41.2 |
| 2015/0358113 A1* | 12/2015 | Callard | H04W 28/04 714/776 |
| 2016/0142177 A1 | 5/2016 | Chou et al. | |

FOREIGN PATENT DOCUMENTS

| | | |
|---|---|---|
| CN | 105898672 A | 8/2016 |
| CN | 108347716 A | 7/2018 |

(Continued)

OTHER PUBLICATIONS

M. A. M. Mohamed et al.,"Optimization of Bluetooth Frame Formatfor Efficient Performance", Progress In Electromagnetics Research M, vol. 1, 101-110, 2008, total: 10 pages.

(Continued)

*Primary Examiner* — Elton Williams

(57) ABSTRACT

A Bluetooth data packet processing method is disclosed. According to the Bluetooth data packet processing method, a standard Bluetooth baseband protocol is extended, so that a Bluetooth node can also support polar encoding/decoding based on compatibility with the standard Bluetooth protocol. When processing a Bluetooth data packet, the Bluetooth node may choose to perform polar encoding on the data packet by using an extended Bluetooth baseband protocol, to improve demodulation performance of a Bluetooth receiver, and improve an anti-interference capability of a Bluetooth system.

14 Claims, 13 Drawing Sheets

(56) References Cited

FOREIGN PATENT DOCUMENTS

| CN | 108667464 A | 10/2018 |
|---|---|---|
| CN | 108696339 A | 10/2018 |

OTHER PUBLICATIONS

Muhammad, M. A. M. et al., "Bluetooth performance improvement using convolutional codes", Mar. 30, 2009, total: 2 pages.
International Search Report and Written Opinion issued in PCT/CN2021/104555, dated Sep. 29, 2021, 10 pages.
Spörk Michael et al: "Performance and Trade-offs of the new PHY Modes of BLE 5", Proceedings of the ACM Mobihoc Workshop on Pervasive Systems in the IOT ERA, Jul. 2, 2019 (Jul. 2, 2019), pp. 7-12, XP093075588.
Extended European Search Report issued in EP21850687.1, dated Sep. 1, 2023, 10 pages.

* cited by examiner (a)

(b)

METHOD FOR PROCESSING BLUETOOTH DATA PACKET AND COMMUNICATION APPARATUS

This application is a continuation of International Patent Application No. PCT/CN2021/104555, filed on Jul. 5, 2021, which claims priority to Chinese Patent Application No. 202010763031.8, filed on Jul. 31, 2020. The disclosures of the aforementioned applications are hereby incorporated by reference in their entireties.

TECHNICAL FIELD

The present disclosure relates to the field of Bluetooth communication technologies, and more specifically, to a method for processing a Bluetooth data packet and a communication apparatus.

BACKGROUND

Bluetooth (BT) is a radio technology that supports short-range communication between electronic devices, and is widely used in electronic products such as mobile phones, watches, and notebook computers. The Bluetooth Special Interest Group performs technical evolution and standard maintenance for the Bluetooth technology, and released a version 5.1 of Bluetooth in 2019. A Bluetooth 5.1 protocol is divided into two physical layers: basic rate (BR)/enhanced data rate (EDR) and low energy (LE). The BR/EDR is mainly used in data transmission, voice, audio transmission, and the like. The LE is mainly used in scenarios such as a location service, an internet of things, and long-distance and low-energy coverage.

In a BR/EDR physical layer protocol of the Bluetooth 5.1 protocol, most data packets do not support forward error correction (FEC) error control. This results in low error correction performance of a Bluetooth receiver, and affects an anti-interference capability of the Bluetooth technology. In addition, although some data packets support FEC, error correction performance of an error correction code defined in a standard Bluetooth protocol is usually insufficiently good, and therefore to-be-encoded original data bits cannot be protected differently based on importance. In an LE physical layer protocol of the Bluetooth protocol, an error correction code is introduced into some existing solutions. Although performance is slightly improved, data bits still cannot be protected differently based on their importance.

A Bluetooth system has a poor anti-interference capability due to the foregoing reasons.

SUMMARY

The present disclosure provides a method for processing a Bluetooth data packet and a communication apparatus. A standard Bluetooth baseband protocol is extended, so that a Bluetooth node can support polar encoding/decoding, to differently protect data bits of different importance, and improve an anti-interference capability of a Bluetooth system.

According to a first aspect, the present disclosure provides a method for processing a Bluetooth data packet. The method includes:
 a first Bluetooth node obtains a bit stream of a to-be-sent payload;
 the first Bluetooth node determines an encoding scheme, where the encoding scheme is polar encoding or standard Bluetooth encoding;
 when the determined encoding scheme is the polar encoding, the first Bluetooth node performs polar encoding on the bit stream of the payload according to an extended Bluetooth baseband protocol, to obtain an extended Bluetooth data packet, where the extended Bluetooth baseband protocol supports the polar encoding scheme; and
 the first Bluetooth node sends the extended Bluetooth data packet to a second Bluetooth node that has established a Bluetooth connection.

In the technical solutions of the present disclosure, an existing standard Bluetooth baseband protocol is extended to support polar FEC. Therefore, a transmit end may perform polar encoding on the bit stream of the to-be-sent payload, and a signal-to-noise ratio of demodulation by a receiver at a receive end can be reduced by using a polar code error correction capability, thereby improving an anti-interference capability of a Bluetooth system.

In addition, because the anti-interference capability of the Bluetooth system is improved, reception sensitivity of the Bluetooth receiver is improved, so that a Bluetooth signal can cover a longer distance.

In addition, a polar decoder may perform decoding by using a low-complexity SC decoding scheme, and therefore is more suitable for a Bluetooth low energy application scenario.

With reference to the first aspect, in some implementations of the first aspect, the extended Bluetooth baseband protocol is an extended BR baseband protocol or an extended EDR baseband protocol, where in the extended BR baseband protocol or the extended EDR baseband protocol, the extended Bluetooth data packet includes a data packet header and the payload, the data packet header includes a type field, and the type field is used to indicate that an encoding scheme of the payload is the polar encoding.

A type field in a packet header in a data packet frame format defined in the BR/EDR baseband protocol is extended, so that a data packet that originally supports the BR/EDR baseband protocol can support polar FEC through extension, and extension complexity can be reduced. In addition, an extended data packet is compatible with an existing Bluetooth baseband protocol, and has good compatibility.

With reference to the first aspect, in some implementations of the first aspect, the extended Bluetooth data packet includes one or more of:
 an HV3 data packet of an SCO logical link;
 an EV3 data packet and an EV5 data packet of an extended eSCO logical link;
 a 2-EV3 data packet, a 2-EV5 data packet, a 3-EV3 data packet, and a 3-EV5 data packet of the eSCO logical link; or
 a DH1 data packet, a DH3 data packet, and a DH5 data packet of an ACL logical link.

Data packet types without FEC protection on a logical link are extended to support polar FEC, so that a capability of a receive end for demodulating these types of data packets can be improved, thereby improving an anti-interference capability of a Bluetooth link or increasing a Bluetooth coverage area.

With reference to the first aspect, in some implementations of the first aspect, if a type of the extended Bluetooth data packet is a data packet of the eSCO logical link, a length and/or a bit rate of the extended Bluetooth data packet are determined through negotiation when the first Bluetooth node and the second Bluetooth node establish the eSCO logical link.

A length of a data packet on an eSCO logical link is usually not fixed, and is negotiated upon by Bluetooth nodes when the eSCO logical link is established. However, in this embodiment, a data packet on an eSCO logical link can support polar FEC after being extended, and a packet length and/or a bit rate of an extended data packet are determined through negotiation by Bluetooth nodes when the eSCO logical link is established. The extended data packet is compatible with an existing standard Bluetooth protocol, and has good compatibility.

With reference to the first aspect, in some implementations of the first aspect, if a type of the extended Bluetooth data packet is a data packet of the ACL logical link, LMP signaling used for feature negotiation between the first Bluetooth node and the second Bluetooth node includes a packet type mapping parameter. The packet type mapping parameter is used to negotiate upon the type of the extended Bluetooth data packet transmitted on the ACL logical link.

A polar FEC support feature of a data packet of an ACL logical link is extended by using a packet type mapping parameter when the ACL logical link is established by using LMP signaling between Bluetooth nodes. This can reduce extension complexity. In addition, the data packet is compatible with a standard Bluetooth baseband protocol, and has good compatibility.

With reference to the first aspect, in some implementations of the first aspect, the packet type mapping parameter includes a first extended value and/or a second extended value. The first extended value is used to indicate that the extended Bluetooth data packet transmitted on the ACL logical link is a Bluetooth data packet based on the extended BR baseband protocol. The second extended value is used to indicate that the extended Bluetooth data packet transmitted on the ACL logical link is a Bluetooth data packet based on the extended EDR baseband protocol.

The data packet of the ACL logical link supports polar FEC. Therefore, a type of a data packet supporting a BR baseband protocol may be extended, or a type of a data packet supporting an EDR baseband protocol may be extended, or both types may be extended, so that flexibility of supporting polar FEC by the data packet of the ACL logical link can be improved.

With reference to the first aspect, in some implementations of the first aspect, a payload of the extended Bluetooth data packet transmitted on the ACL logical link includes a payload header and payload data, where the payload header is encoded by using a polar encoding scheme with a fixed bit rate, and the payload header is used to indicate a length and/or a bit rate of the payload data.

The payload of the Bluetooth data packet of the ACL logical link includes a separate payload header. Compared with the payload data, the payload header should be protected at a higher priority. Therefore, polar encoding is separately performed on the payload header, so that bits of different importance can be protected differently, thereby helping improve an anti-interference capability of the Bluetooth data packet.

In addition, polar encoding is performed on the payload header by using a fixed bit rate, thereby helping reduce signaling overheads of bit rate negotiation between Bluetooth nodes.

With reference to the first aspect, in some implementations of the first aspect, the extended Bluetooth baseband protocol is an extended LE baseband protocol, where in the extended LE baseband protocol, the extended Bluetooth data packet includes a preamble, a first FEC block, and a second FEC block, the first FEC block includes a coding indicator (CI) field, the second FEC block includes the payload, and an extended value of the CI field is used to indicate the polar encoding scheme of the second FEC block.

A CI field in an FEC block 1 (namely, the first FEC block) in an LE baseband protocol is extended, so that a data packet that originally supports the LE baseband protocol can support polar FEC through extension. In addition, the data packet is compatible with an existing Bluetooth baseband protocol, and has good compatibility.

In addition, the extended LE protocol supports polar encoding on a basis of supporting original CC encoding with a specific constraint length (for example, the constraint length is 4), thereby enhancing demodulation performance of a receiver of the LE protocol, and improving an anti-interference capability or further increasing a coverage distance of a Bluetooth signal of the LE protocol.

With reference to the first aspect, in some implementations of the first aspect, the CI field includes a third extended value and/or a fourth extended value, where the third extended value is used to indicate that an encoding scheme with S=8 and the polar encoding scheme are used for the second FEC block, and the fourth extended value is used to indicate that an encoding scheme with S=2 and the polar encoding scheme are used for the second FEC block.

In a standard LE baseband protocol, an FEC block 2 supports two encoding schemes: S=8 or S=2. In this embodiment, the extended Bluetooth data packet supports polar FEC, and is also compatible with an existing encoding scheme with S=8 or S=2.

With reference to the first aspect, in some implementations of the first aspect, a payload of the second FEC block includes a payload header and payload data, where polar encoding with a fixed bit rate is performed on the payload header, and the payload header is used to indicate a length and/or a bit rate of the payload data.

Data in different parts of the Bluetooth data packet, for example, the payload header and the payload data, and different bits in the payload header are of different importance (for example, a field used to indicate a packet length and a bit rate has higher importance than other fields). Polar FEC encoding has a function of distinguishing between importance of bits, and can better adapt to the Bluetooth data packet.

The payload of the Bluetooth data packet supporting the LE baseband protocol includes a separate payload header. Compared with the payload data, the payload header has higher importance. Therefore, polar encoding is separately performed on the payload header, so that bits of different importance can be protected differently, and an anti-interference capability can be improved.

With reference to the first aspect, in some implementations of the first aspect, the payload header includes a first length field and a second length field, where the first length field is used to indicate an original information length of the second FEC block, the second length field is used to indicate a length of an encoded second FEC block, and the original information length of the second FEC block does not include a length of the payload header; or the first length field is used to indicate a bit rate of the second FEC block, and the second length field is used to indicate a length of an encoded second FEC block.

In this embodiment, the payload header on which polar encoding is performed may indicate a length and/or a bit rate of the subsequent payload data. The receive end can determine the length and the bit rate of the payload data by decoding the payload header, and then decode the payload data.

With reference to the first aspect, in some implementations of the first aspect, the extended Bluetooth data packet is a data packet, based on the extended LE baseband protocol, of an advertising physical channel or a data physical channel.

With reference to the first aspect, in some implementations of the first aspect, the method further includes:
the first Bluetooth node sends a first LMP message to the second Bluetooth node, where the first LMP message is used to request to perform feature exchange with the second Bluetooth node, and the first LMP message carries a polar encoding scheme support feature of the first Bluetooth node;
the first Bluetooth node receives, from the second Bluetooth node, a second LMP message used to respond to the first LMP message, where the second LMP message carries a polar encoding scheme support feature of the second Bluetooth node; and
the first Bluetooth node obtains, based on the second LMP message, the polar encoding scheme support feature of the second Bluetooth node.

Optionally, when the first Bluetooth node and the second Bluetooth node exchange a polar encoding support feature, alternatively, the second Bluetooth node may first initiate a feature exchange request to the first Bluetooth node, and then complete feature exchange. A specific implementation of the feature exchange is not limited in the present disclosure.

When establishing a connection, Bluetooth nodes negotiate with each other upon support for a polar feature, thereby ensuring compatibility with polar encoding/decoding at a protocol layer. After two Bluetooth nodes that support polar encoding/decoding are paired and establish a connection, an underlying function of performing FEC protection by using a polar code is added between the nodes.

With reference to the first aspect, in some implementations of the first aspect, the method further includes:
based on the polar encoding scheme support feature of each of the first Bluetooth node and the second Bluetooth node, when determining that the first Bluetooth node supports the polar encoding scheme and the second Bluetooth node supports the polar encoding scheme, the first Bluetooth node determines that the encoding scheme is the polar encoding.

With reference to the first aspect, in some implementations of the first aspect, the extended Bluetooth baseband protocol includes an extended feature mask table, and the extended feature mask table includes one of the following cases:
the extended feature mask table is a feature mask page 0, a feature mask page 1, or a feature mask page 2, and a reserved bit or an extended bit of the feature mask page 0, the feature mask page 1, or the feature mask page 2 is used to indicate a polar encoding scheme support feature of a Bluetooth node; or
the extended feature mask table is a feature mask page 3, and the feature mask page 3 is used to indicate a polar encoding scheme support feature of a Bluetooth node.

A reserved bit of a feature mask table (for example, the feature mask page 0, the feature mask page 1, or the feature mask page 2) used for feature exchange between Bluetooth nodes is extended, or a new feature mask table is extended, so that the Bluetooth nodes can negotiate upon a polar encoding/decoding support feature, thereby ensuring support for and compatibility with a polar encoding/decoding feature at a protocol layer.

According to a second aspect, the present disclosure provides a method for processing a Bluetooth data packet. The method includes:
a second Bluetooth node receives an extended Bluetooth data packet from a first Bluetooth node, where the extended Bluetooth data packet is encoded by using a polar encoding scheme; and
the second Bluetooth node decodes the extended Bluetooth data packet by using a polar code decoding method corresponding to the polar encoding, to obtain a payload of the extended Bluetooth data packet.

With reference to the second aspect, in some implementations of the second aspect, the extended Bluetooth baseband protocol is an extended BR baseband protocol or an extended EDR baseband protocol, where in the extended BR baseband protocol or the extended EDR baseband protocol, the extended Bluetooth data packet includes a data packet header and the payload, the data packet header includes a type field, and the type field is used to indicate an encoding scheme of the payload; and
that the second Bluetooth node decodes the extended Bluetooth data packet by using a polar code decoding method corresponding to the polar encoding, to obtain a payload of the extended Bluetooth data packet includes:
the second Bluetooth node decodes the data packet header of the extended Bluetooth data packet to obtain the type field, and determines, based on the type field, that the polar encoding scheme is used for the extended Bluetooth data packet.

With reference to the second aspect, in some implementations of the second aspect, the extended Bluetooth data packet includes one or more of:
an HV3 data packet of an SCO logical link;
an EV3 data packet and an EV5 data packet of an eSCO logical link;
a 2-EV3 data packet, a 2-EV5 data packet, a 3-EV3 data packet, and a 3-EV5 data packet of the eSCO logical link; or
a DH1 data packet, a DH3 data packet, and a DH5 data packet of an ACL logical link.

With reference to the second aspect, in some implementations of the second aspect, if a type of the extended Bluetooth data packet is a data packet of the eSCO logical link, a length and/or a bit rate of the extended Bluetooth data packet are determined through negotiation when the first Bluetooth node and the second Bluetooth node establish the eSCO logical link.

With reference to the second aspect, in some implementations of the second aspect, if a type of the extended Bluetooth data packet is a data packet of the ACL logical link, LMP signaling used for feature negotiation between the first Bluetooth node and the second Bluetooth node includes a packet type mapping parameter. The packet type mapping parameter is used to negotiate upon the type of the extended Bluetooth data packet transmitted on the ACL logical link.

With reference to the second aspect, in some implementations of the second aspect, the packet type mapping parameter includes a first extended value and/or a second extended value. The first extended value is used to indicate that the extended Bluetooth data packet transmitted on the ACL logical link is a Bluetooth data packet based on the extended BR baseband protocol. The second extended value is used to indicate that the extended Bluetooth data packet transmitted on the ACL logical link is a Bluetooth data packet based on the extended EDR baseband protocol.

With reference to the second aspect, in some implementations of the second aspect, a payload of the extended Bluetooth data packet transmitted on the ACL logical link includes a payload header and payload data, where the payload header is used to indicate a length and/or a bit rate of the payload data; and the method further includes:
the second Bluetooth node performs polar decoding on the payload header by using a fixed bit rate to obtain the length and/or the bit rate of the payload data, and decodes the payload data based on the length and/or the bit rate of the payload data.

With reference to the second aspect, in some implementations of the second aspect, the extended Bluetooth baseband protocol is an extended low energy (LE) baseband protocol, where in the extended LE baseband protocol, the extended Bluetooth data packet includes a preamble, a first FEC block, and a second FEC block, the first FEC block includes a coding indicator (CI) field, the second FEC block includes the payload, and an extended value of the CI field is used to indicate the polar encoding scheme of the second FEC block; and that the second Bluetooth node decodes the extended Bluetooth data packet by using a polar code decoding method corresponding to the polar encoding, to obtain a payload of the extended Bluetooth data packet includes:
the second Bluetooth node decodes the CI field of the first FEC block, and determines, based on the CI field, that the polar encoding scheme is used for the extended Bluetooth data packet.

With reference to the second aspect, in some implementations of the second aspect, the CI field includes a third extended value and/or a fourth extended value, where the third extended value is used to indicate that an encoding scheme with S=8 and the polar encoding scheme are used for the second FEC block, and the fourth extended value is used to indicate that an encoding scheme with S=2 and the polar encoding scheme are used for the second FEC block.

With reference to the second aspect, in some implementations of the second aspect, a payload of the second FEC block includes a payload header and payload data, where the payload header is encoded by using a polar encoding scheme with a fixed bit rate, and the payload header is used to indicate a length and/or a bit rate of the payload data; and the method further includes:
the second Bluetooth node performs polar decoding on the payload header by using a fixed bit rate to obtain the length and/or the bit rate of the payload data, and decodes the payload data based on the length and/or the bit rate of the payload data.

With reference to the second aspect, in some implementations of the second aspect, the payload header includes a first length field and a second length field, where
the first length field is used to indicate an original information length of the second FEC block, the second length field is used to indicate a length of an encoded second FEC block, and the original information length of the second FEC block does not include a length of the payload header; or
the first length field is used to indicate a bit rate of the second FEC block, and the second length field is used to indicate a length of an encoded second FEC block.

With reference to the second aspect, in some implementations of the second aspect, the extended Bluetooth data packet is a data packet, based on the extended LE baseband protocol, of an advertising physical channel or a data physical channel.

With reference to the second aspect, in some implementations of the second aspect, the method further includes:
the second Bluetooth node receives a first LMP message from the first Bluetooth node, where the first LMP message is used to request to perform feature exchange with the second Bluetooth node, and the first LMP message carries a polar encoding scheme support feature of the first Bluetooth node; and
the second Bluetooth node sends, to the first Bluetooth node, a second LMP message used to respond to the first LMP message, where the second LMP message carries a polar encoding scheme support feature of the second Bluetooth node, so that the first Bluetooth node obtains, based on the second LMP message, the polar encoding scheme support feature of the second Bluetooth node.

With reference to the second aspect, in some implementations of the second aspect, when the first Bluetooth node supports the polar encoding scheme and the second Bluetooth node supports the polar encoding scheme, the second Bluetooth node receives the extended Bluetooth data packet from the first Bluetooth node.

With reference to the second aspect, in some implementations of the second aspect, the extended Bluetooth baseband protocol includes an extended feature mask table, and the extended feature mask table includes one of the following cases:
the extended feature mask table is a feature mask page 0, a feature mask page 1, or a feature mask page 2, and a reserved bit or an extended bit of the feature mask page 0, the feature mask page 1, or the feature mask page 2 is used to indicate a polar encoding scheme support feature of a Bluetooth node; or
the extended feature mask table is a feature mask page 3, and the feature mask page 3 is used to indicate a polar encoding scheme support feature of a Bluetooth node.

For a beneficial technical effect of the method in any one of the second aspect or the implementations of the second aspect, refer to a corresponding solution in the first aspect.

According to a third aspect, the present disclosure provides a communication apparatus. The communication apparatus has a function of implementing the method in any one of the first aspect or the possible implementations of the first aspect. The function may be implemented by hardware, or may be implemented by hardware executing corresponding software. The hardware or the software includes one or more units corresponding to the foregoing function.

According to a fourth aspect, the present disclosure provides a communication apparatus. The communication apparatus has a function of implementing the method in any one of the second aspect or the possible implementations of the second aspect. The function may be implemented by hardware, or may be implemented by hardware executing corresponding software. The hardware or the software includes one or more units corresponding to the foregoing function.

According to a fifth aspect, the present disclosure provides a communication device, including a processor, a memory, and a transceiver. The memory is configured to store a computer program. The processor is configured to invoke and run the computer program stored in the memory, and control the transceiver to send or receive a signal, so that the communication device performs the method in any one of the first aspect or the possible implementations of the first aspect.

According to a sixth aspect, the present disclosure provides a communication device, including a processor, a memory, and a transceiver. The memory is configured to store a computer program. The processor is configured to invoke and run the computer program stored in the memory, and control the transceiver to send or receive a signal, so that the communication device performs the method in any one of the second aspect or the possible implementations of the second aspect.

According to a seventh aspect, the present disclosure provides a communication apparatus (for example, a chip), including a processor and a communication interface. The communication interface is configured to receive a signal and transmit the received signal to the processor. The processor processes the signal, so that the communication apparatus performs the method in any one of the first aspect or the possible implementations of the first aspect.

Optionally, the communication interface may be an interface circuit or an input/output interface, and the processor may be a processing circuit, a logic circuit, or the like.

For example, the communication apparatus is a chip, the chip includes a communication interface and a processor, the communication interface is configured to receive a bit stream of a to-be-sent payload and transmit the bit stream of the payload to the processor, the processor processes the bit stream of the payload to generate an extended Bluetooth data packet, and the communication interface is further configured to output the extended Bluetooth data packet.

According to an eighth aspect, the present disclosure provides a communication apparatus (for example, a chip), including a processor and a communication interface. The communication interface is configured to receive a signal and transmit the received signal to the processor. The processor processes the signal, so that the communication apparatus performs the method in any one of the second aspect or the possible implementations of the second aspect.

Optionally, the communication interface may be an interface circuit or an input/output interface, and the processor may be a processing circuit, a logic circuit, or the like.

For example, the communication apparatus is a chip, the chip includes a communication interface and a processor, the communication interface is configured to receive an extended Bluetooth data packet and transmit the extended Bluetooth data packet to the processor, the processor processes the extended Bluetooth data packet to obtain a payload, and the communication interface is further configured to output the payload.

According to a ninth aspect, the present disclosure provides a computer-readable storage medium. The computer-readable storage medium stores computer instructions. When the computer instructions are run on a computer, the method in any one of the first aspect or the possible implementations of the first aspect is performed.

According to a tenth aspect, the present disclosure provides a computer-readable storage medium. The computer-readable storage medium stores computer instructions. When the computer instructions are run on a computer, the method in any one of the second aspect or the possible implementations of the second aspect is performed.

According to an eleventh aspect, the present disclosure provides a computer program product. The computer program product includes computer program code. When the computer program code is run on a computer, the method in any one of the first aspect or the possible implementations of the first aspect is performed.

According to a twelfth aspect, the present disclosure provides a computer program product. The computer program product includes computer program code. When the computer program code is run on a computer, the method in any one of the second aspect or the possible implementations of the second aspect is performed.

According to a thirteenth aspect, the present disclosure provides a Bluetooth communication system, including the communication device according to the fifth aspect and/or the communication device according to the sixth aspect.

DESCRIPTION OF EMBODIMENTS

The following describes technical solutions of the present disclosure with reference to the accompanying drawings.

A current Bluetooth baseband protocol is divided into two physical layers: basic rate (BR)/enhanced data rate (EDR) and low energy (LE). An earlier Bluetooth protocol supports only one physical layer: the BR/EDR. The BR/EDR is mainly used in data transmission, voice, audio transmission, and the like. The LE is a physical layer protocol subsequently added for low energy, and is mainly used in scenarios such as a location service, an internet of things, and long-distance and low-energy coverage.

In a BR/EDR physical layer protocol of the Bluetooth protocol, most data packets do not support forward error correction (FEC). This results in low error correction performance of a Bluetooth receiver, and affects an anti-interference capability and a coverage area of a Bluetooth technology. In addition, some other data packets can support FEC, but an error correction code defined in a standard Bluetooth protocol is an earlier Hamming code. Error correction performance of the Hamming code is insufficiently good. In addition, the Hamming code is a linear error correction code, and importance of original data encoded by using the Hamming code is not distinguished. In the LE physical layer protocol, two data packet structures are defined: a coded physical layer (referred to as a coded PHY below) and an uncoded physical layer (referred to as an uncoded PHY below). A convolutional code (CC) with a specific constraint length is used for FEC at the coded PHY Performance of the convolutional code is improved to some extent compared with the Hamming code, but data bits still cannot be protected differently based on their importance.

The following describes technical solutions of the present disclosure.

In an embodiment of the present disclosure, considering that bit data at different locations is of different importance in a polar code construction process, a polar code encoding/decoding function is added to a bit stream processing process of a Bluetooth baseband protocol. In addition, support for a polar packet type is extended on the Bluetooth baseband protocol, thereby enhancing demodulation performance of a Bluetooth receiver based on the Bluetooth baseband protocol, and improving an anti-interference capability of a Bluetooth system.

A transmit end and a receive end of a Bluetooth link are included in embodiments of the present disclosure. Both the transmit end and the receive end are Bluetooth devices.

Figure 1:
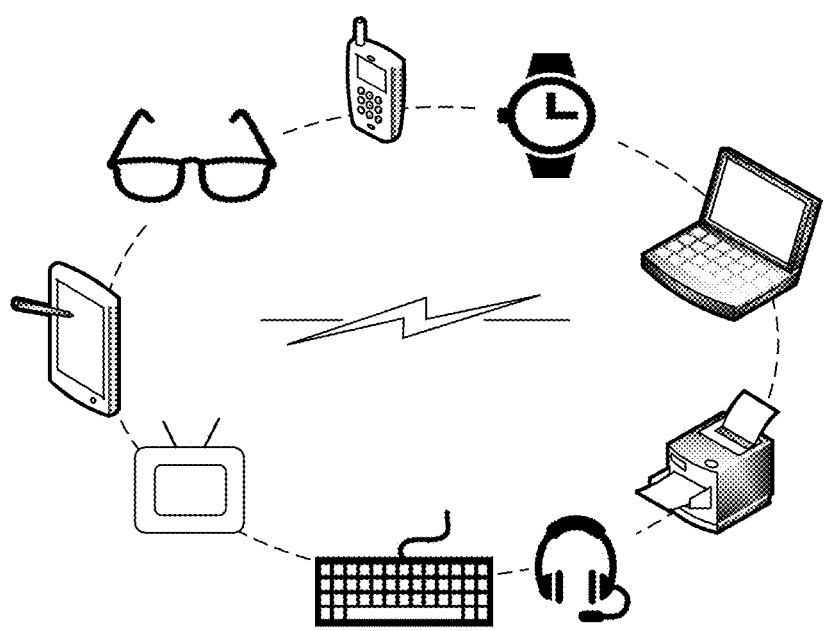
FIG. 1 shows a Bluetooth link communication system to which an embodiment of the present disclosure is applicable.

FIG. 1 shows a Bluetooth link communication system to which an embodiment of the present disclosure is applicable. In the Bluetooth system shown in FIG. 1, Bluetooth devices include but are not limited to electronic devices such as a communication server, a router, a switch, a bridge, a computer, a mobile phone, a computer, a portable device, a pad, a stylus, a television (TV), glasses, a watch, a headset, and a keyboard, a vehicle-mounted device, a wearable device, an intelligent household device, and the like. The foregoing devices jointly constitute a Bluetooth system. In the Bluetooth system, one device may serve as a primary device, and other devices serve as secondary devices. The secondary devices perform point-to-point communication with the primary device; or any two of the foregoing devices may establish a point-to-point Bluetooth connection, where one device is a primary device, and the other device is a secondary device.

It should be noted that the primary device and the secondary device are not distinguished in embodiments of the present disclosure. On a point-to-point Bluetooth link, a Bluetooth device serving as a transmit end is referred to as a first Bluetooth node, and a Bluetooth device serving as a receive end is referred to as a second Bluetooth node.

Figure 2:
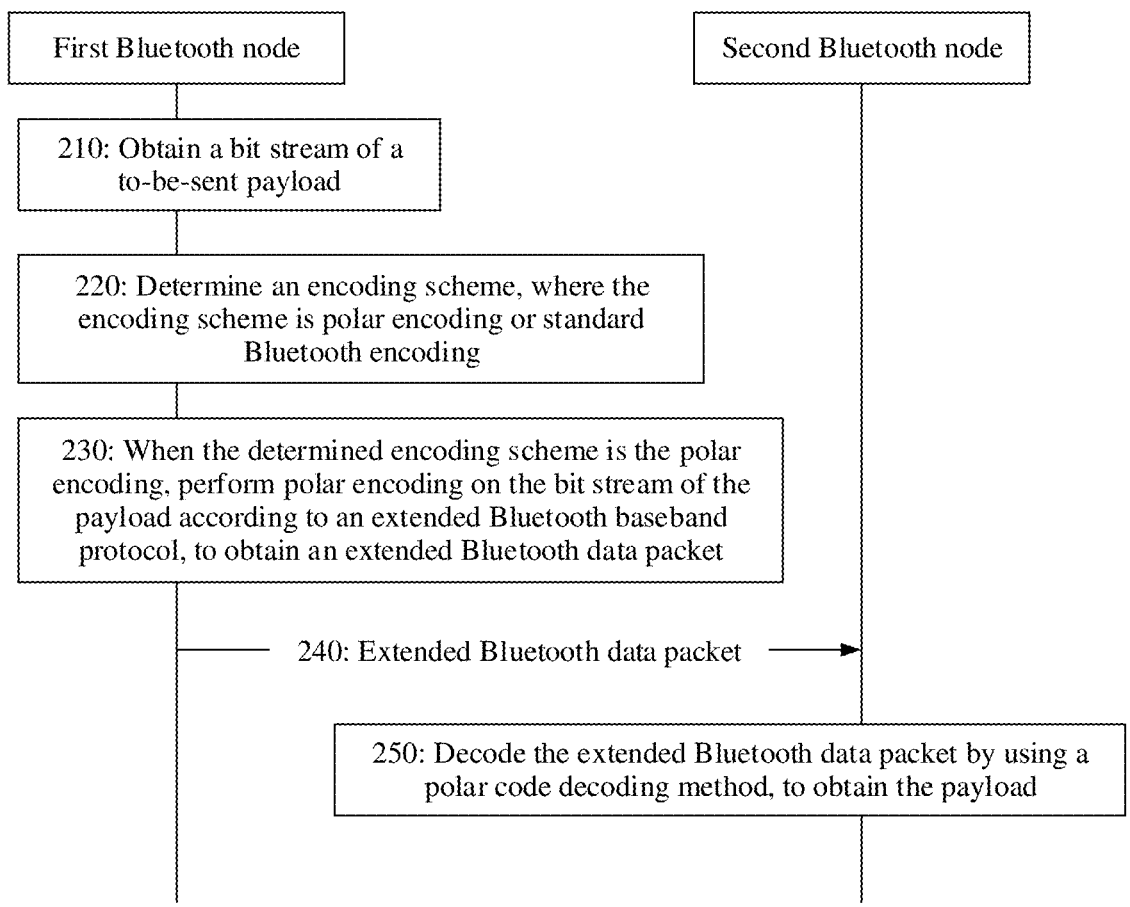
FIG. 2 is a flowchart of processing a Bluetooth data packet according to an embodiment of the present disclosure.

FIG. 2 is a flowchart of processing a Bluetooth data packet according to an embodiment of the present disclosure. In the following embodiments, a transmit end of a Bluetooth link is referred to as a first Bluetooth node, and a receive end is referred to as a second Bluetooth node. The process shown in FIG. 2 may be performed by a Bluetooth node that has established a Bluetooth link, or performed by a module or an assembly, such as a chip or an integrated circuit, mounted in the Bluetooth node, a device with a corresponding function, or the like. An example in which the process is performed by a Bluetooth node is used below for description.

210: A first Bluetooth node obtains a bit stream of a to-be-sent payload.

Optionally, the payload is sometimes also referred to as an effective payload, and both indicate a same meaning in the present disclosure.

220: The first Bluetooth node determines an encoding scheme, where the encoding scheme is polar encoding or standard Bluetooth encoding.

In step 220, the standard Bluetooth encoding includes Bluetooth encoding without FEC protection and Bluetooth encoding with FEC protection, for example, Bluetooth encoding with FEC protection by using a Hamming code or a CC.

230: When the determined encoding scheme is the polar encoding, the first Bluetooth node performs polar encoding on the bit stream of the payload according to an extended Bluetooth baseband protocol, to obtain an extended Bluetooth data packet.

If the first Bluetooth node determines to use the standard Bluetooth encoding, the first Bluetooth node encodes the payload according to a standard Bluetooth baseband protocol, to obtain a standard Bluetooth data packet.

As described above, Bluetooth baseband protocols are classified into a BE/EDR-based Bluetooth baseband protocol and an LE-based Bluetooth baseband protocol. In different Bluetooth baseband protocols, frame formats of Bluetooth data packets are also different. For details, refer to stipulation in a standard Bluetooth protocol.

If the first Bluetooth node determines to use the polar encoding scheme, the first Bluetooth node performs polar encoding on the payload according to the extended Bluetooth baseband protocol provided in the present disclosure, to obtain the extended Bluetooth data packet.

It should be noted that, in this embodiment, to enable an existing Bluetooth baseband protocol to support a polar data packet, an existing standard Bluetooth baseband protocol is extended in the present disclosure, that is, the "extended Bluetooth baseband protocol" described in this embodiment is obtained. Correspondingly, the "extended Bluetooth data packet" described in this embodiment is a data packet obtained by encoding the payload according to the extended Bluetooth baseband protocol, and is distinguished from the standard Bluetooth data packet obtained by encoding the payload by the first Bluetooth node by using the standard Bluetooth baseband protocol.

In addition, the first Bluetooth node may choose, according to a plurality of rules, whether to use polar FEC or BT FEC. This is not limited in embodiments of the present disclosure.

For example, when a probability that a data packet sent by the first Bluetooth node is correctly received by the second Bluetooth node is high, a Bluetooth link between the first Bluetooth node and the second Bluetooth node is in good condition. In this case, the first Bluetooth node may choose to use the BT FEC. Alternatively, when a packet error rate is less than a specified threshold, the first Bluetooth node may communicate with the second Bluetooth node even by using a standard Bluetooth data packet without FEC protection. However, when a packet error rate of a data packet sent by the first Bluetooth node is high, for example, when the packet error rate is greater than a specified threshold, a Bluetooth link between the first Bluetooth node and the second Bluetooth node is in poor condition. In this case, the first Bluetooth node may choose to communicate with the second Bluetooth node by using an extended Bluetooth data packet with polar FEC protection, to improve an error correction capability of a receive end.

240: The first Bluetooth node sends the extended Bluetooth data packet to the second Bluetooth node.

The second Bluetooth node receives the extended Bluetooth data packet from the first Bluetooth node.

250: The second Bluetooth node decodes the extended Bluetooth data packet by using a polar code decoding method, to obtain the payload.

In the following different embodiments, the first Bluetooth node may indicate an encoding scheme of the payload to the second Bluetooth node in different manners. For example, the first Bluetooth node indicates the encoding scheme of the payload by using a data packet header, or indicates an encoding scheme of payload data by using a payload header. Therefore, the second Bluetooth node receives a data packet from the first Bluetooth node, and may decode a packet header or another part (for example, a payload header in the foregoing descriptions) of the data packet to learn of an encoding scheme used for the received data packet, and then decode the received data packet by using a corresponding decoding scheme to obtain a payload. Details are described below.

In embodiments of the present disclosure, a BR/EDR protocol, a BR/EDR baseband protocol, a BE/EDR-based Bluetooth baseband protocol, and the like indicate a same Bluetooth protocol. Likewise, an LE protocol, a BLE protocol, an LE baseband protocol, an LE-based Bluetooth baseband protocol, and the like indicate a same Bluetooth protocol, and are merely different names of a same protocol.

Because frame formats of data packets of an extended BR/EDR baseband protocol and an extended LE baseband protocol are different, the first Bluetooth node notifies the second Bluetooth node of the encoding scheme of the payload in different manners. After learning of the encoding scheme of the payload, the second Bluetooth node decodes, by using a corresponding decoding scheme, the data packet received by the second Bluetooth node.

As described above, the Bluetooth baseband protocols may be classified into the BR/EDR protocol and the LE protocol. In embodiments of the present disclosure, the BR/EDR protocol and the LE protocol are separately extended.

Figure 3:
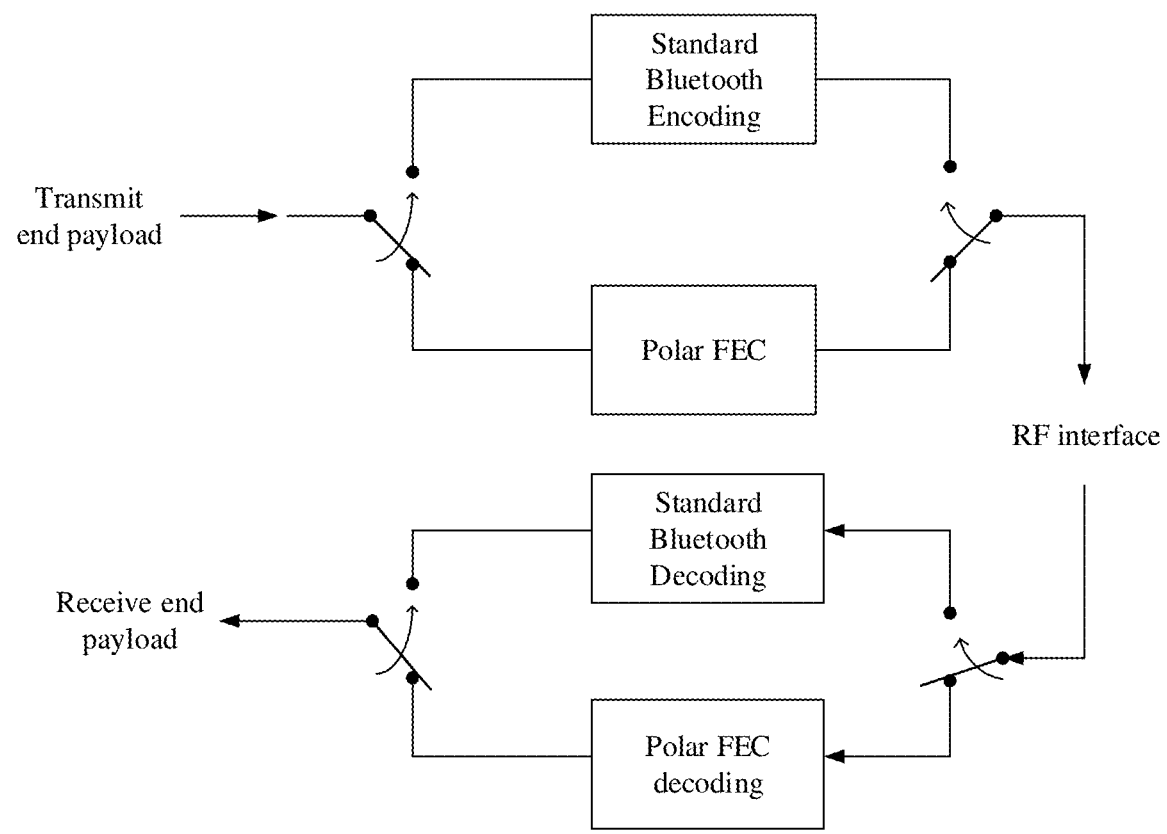
FIG. 3 is a flowchart of encoding and decoding a bit stream of a payload of an extended Bluetooth data packet according to an embodiment of the present disclosure.

FIG. 3 is a flowchart of encoding and decoding a bit stream of a payload of an extended Bluetooth data packet according to an embodiment of the present disclosure. As shown in FIG. 3, a transmit end may choose to perform standard Bluetooth coding or polar encoding (namely, polar FEC protection) on a to-be-sent payload. If standard Bluetooth encoding is performed, a standard Bluetooth data packet is obtained. If polar encoding is performed, an extended Bluetooth data packet is obtained. The standard Bluetooth data packet or the extended Bluetooth data packet is received by a receive end through a radio frequency (RF) interface. The receive end decodes the received data packet by using a decoding scheme corresponding to an encoding scheme at the transmit end. For example, if the transmit end performs standard Bluetooth encoding, the receive end performs standard Bluetooth decoding. If the transmit end performs polar encoding, the receive end uses a polar code decoding method. The receive end decodes the received data packet to obtain a payload.

In the standard Bluetooth encoding, some data packets, for example, most data packets based on the BE/EDR protocol, do not support FEC protection; and some data packets, for example, some data packets based on the BR/EDR protocol and data packets based on the LE protocol, can support FEC protection. In addition, in addition to performing encoding (for example, polar encoding or standard Bluetooth encoding) on the to-be-sent payload, the transmit end may further perform some other optional processing, for example, cyclic redundancy check (CRC), encryption, or whitening. Correspondingly, the receive end needs to perform de-whitening, decryption, CRC check, and other processing. Therefore, the transmit end and the receive end may have a plurality of specific encoding and decoding processes based on FIG. 3. An example is used below for description with reference to FIGS. 4(*a*) and 4(*b*).

FIG. 4(*a*) and FIG. 4(*b*) show an example of a process of encoding and decoding a bit stream of a payload of a Bluetooth data packet according to an embodiment of the present disclosure.

In FIG. 4(*a*), the BR/EDR protocol is used as an example. A branch of using a polar code as an FEC error correction code for a Bluetooth underlying physical channel is added at a transmit end, and the transmit end is also compatible with an encoding/decoding process of a bit stream of a payload in a standard Bluetooth protocol. Correspondingly, a polar code decoding branch corresponding to the branch added at the transmit end is added at a receive end.

Processing or an operation indicated by a dashed-line box in FIG. 4(*a*) indicates optional processing or an optional operation, for example, CRC, encryption, whitening, or other processing at the transmit end. It should be understood that a standard Bluetooth encoder is indicated by a dashed-line box. This indicates that Bluetooth encoding with FEC protection is used if some Bluetooth data packets based on the BR/EDR protocol type support FEC error control. If a Bluetooth data packet based on the BR/EDR protocol type does not support FEC error control, the Bluetooth data packet is not subject to BT FEC encoding protection.

Processing at the receive end corresponds to that at the transmit end. For example, when the transmit end does not perform CRC, encryption, whitening, or other processing, the receive end does not perform de-whitening, decryption, CRC check, or other processing. Likewise, if the transmit end supports FEC error control, the receive end performs FEC decoding; or if the transmit end does not support FEC error control, the receive end does not perform FEC decoding.

For example, when the transmit end performs polar FEC on the payload, the CRC, the encryption, the whitening, and the like are optional steps. For example, after performing polar encoding on the payload, the transmit end may directly send an encoded payload through an RF interface, without performing CRC, encryption, or whitening processing. Alternatively, in addition to performing polar encoding on the payload, the transmit end may choose to perform some of CRC, encryption, or whitening processing. For example, the transmit end performs CRC and encryption on the payload, then performs polar encoding, then performs whitening processing on an encoded codeword, and then sends a processed codeword through the RF interface. For another example, the transmit end performs polar encoding on the payload, and then performs one or more of CRC, encryption, or whitening processing, without performing all processing shown in FIG. 4(a). This is not limited in embodiments of the present disclosure.

Figure 4A:
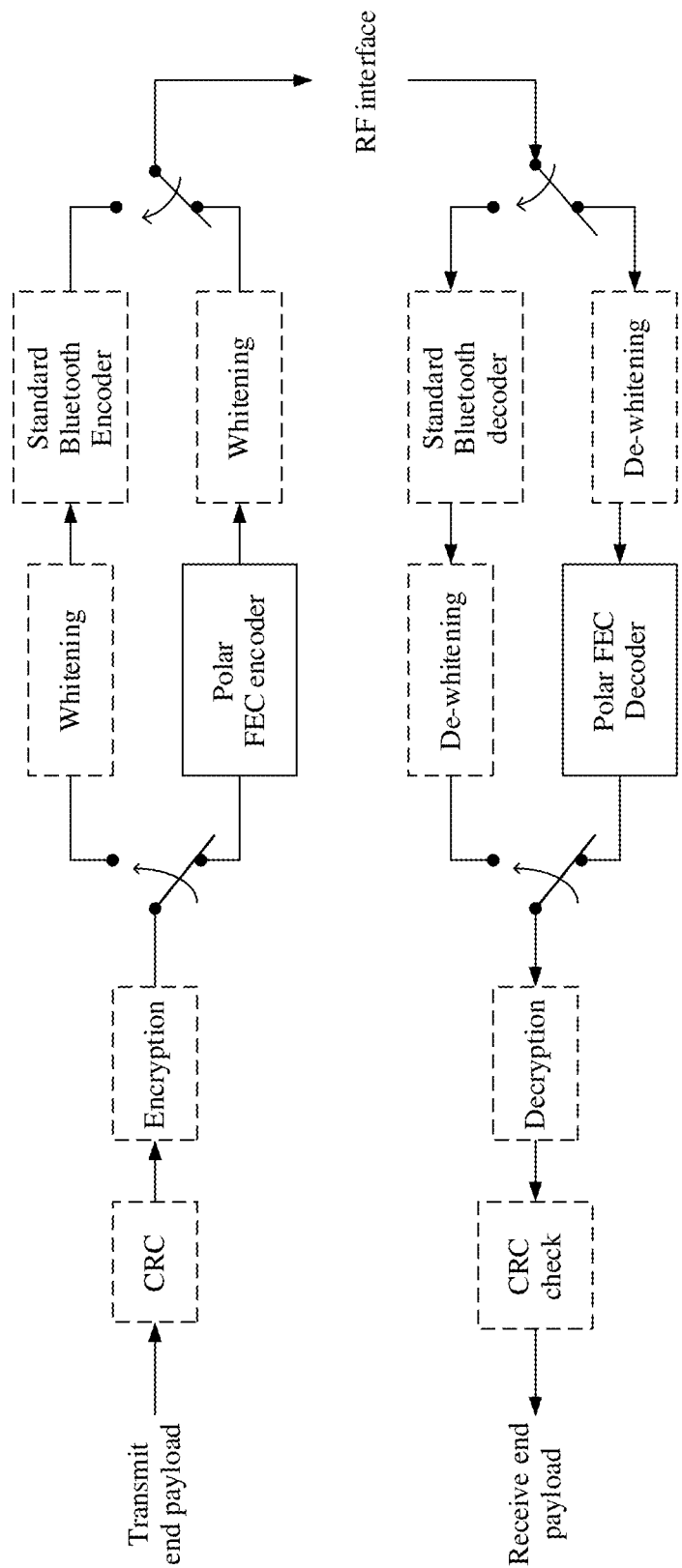
FIG. 4(a) and FIG. 4(b) show an example of a process of encoding and decoding a bit stream of a payload of a Bluetooth data packet according to an embodiment of the present disclosure.

In addition, in FIG. 4(a), an example in which the transmit end performs polar FEC protection on the payload is used. Locations of modules shown in FIG. 4(a) are merely used as an example, and the polar encoding may be set in any step of a series of processing at the transmit end, and is not limited to being between the encryption and the whitening. For example, the polar encoding may be alternatively set before the CRC module, or between the CRC module and the encryption module, or after the whitening module. For example, if the transmit end performs whitening processing, locations of the whitening module and the polar FEC encoding module in FIG. 4(a) may be interchanged.

A person skilled in the art may understand that locations of modules at the receive end correspond to the locations of the modules at the transmit end. After a data packet generated by the transmit end is received by the receive end through the RF interface, processing performed by the receive end on the data packet corresponds to that performed by the transmit end.

Figure 4B:
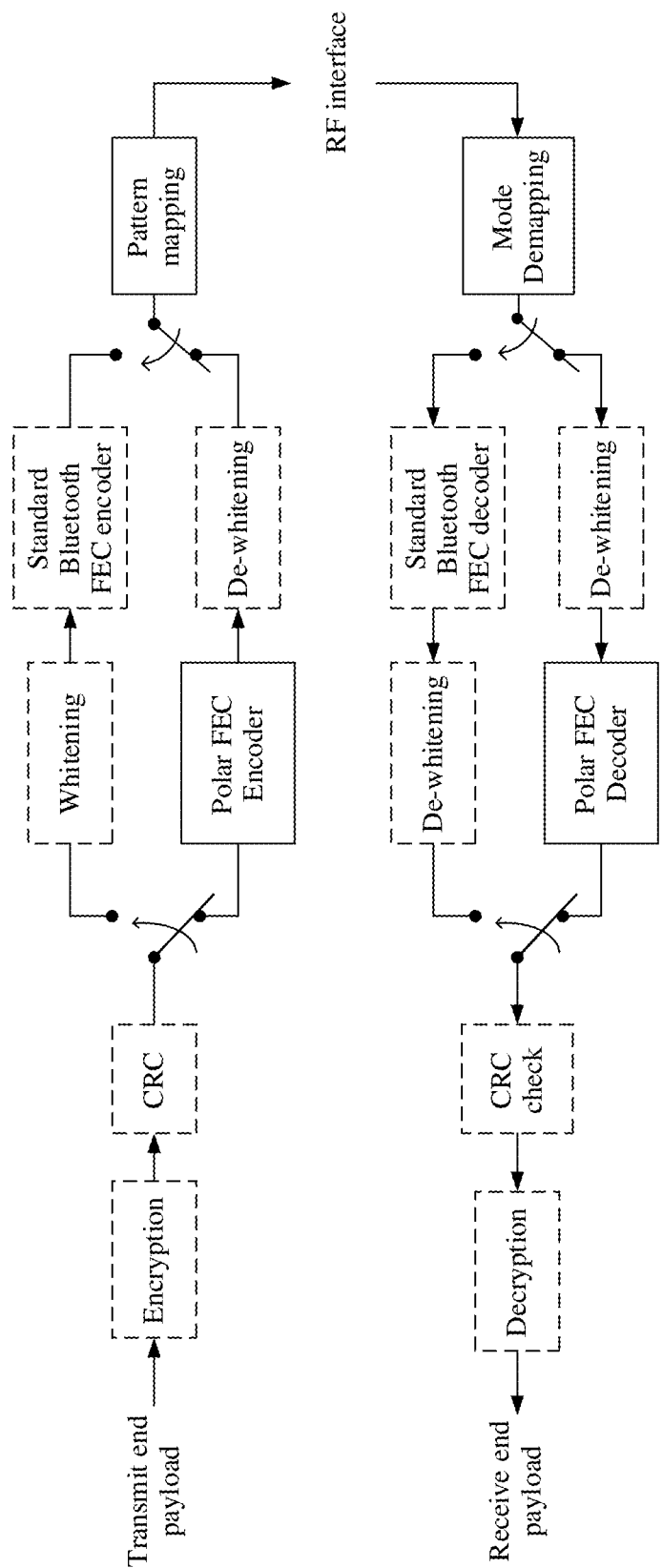

In FIG. 4(b), an example of a payload encoding/decoding process is described by using the LE protocol as an example. FIG. 4(a) and FIG. 4(b) show an encoding/decoding process of a bit stream of a payload at a coded PHY Similar to the payload encoding/decoding process shown in FIG. 4(a), a branch of using a polar code as an FEC error correction code for a Bluetooth underlying physical channel is added at a transmit end, and the transmit end is also compatible with an encoding/decoding process of a bit stream of a payload in a standard Bluetooth protocol.

A difference from FIG. 4(a) lies in that, compared with the BR/EDR protocol, in the LE protocol, the transmit end defines pattern mapping, and correspondingly, a receive end defines a pattern de-mapper. In an LE coded PHY protocol, a pattern mapper converts each bit output by an FEC encoder into a symbol P, where a value of P depends on a used encoding scheme. The pattern mapper may use two different encoding schemes: S=2 or S=8. If S=2, a bit output by the FEC encoder does not change. If S=8, each bit output by the FEC encoder changes to 4 bits. For other processing shown in FIG. 4(b), refer to the descriptions of FIG. 4(a).

As described above, the Bluetooth baseband protocols may be classified into the BR/EDR-based Bluetooth baseband protocol and the LE-based Bluetooth baseband protocol, and frame formats of Bluetooth data packets defined in the two protocols are different. Therefore, in embodiments of the present disclosure, extended protocols of the BR/EDR protocol and the LE protocol are separately described.

The following describes an extended BR/EDR baseband protocol and an extended LE baseband protocol provided in the present disclosure.

1. Extension of the BR/EDR-Based Bluetooth Protocol

To ensure that technical solutions of the present disclosure maintain maximum compatibility with the standard Bluetooth protocol, in the BR/EDR-based Bluetooth protocol, a packet header of a Bluetooth data packet remains in a standard Bluetooth BR/EDR format, and a type field in the packet header is extended to support polar FEC encoding.

Figure 5:
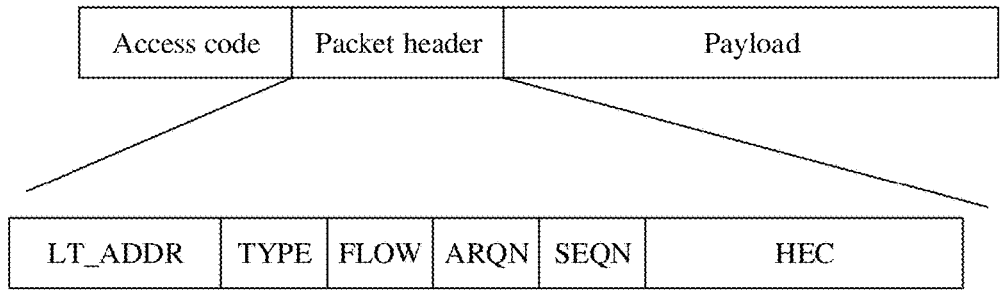
FIG. 5 shows a data packet format of a BR/EDR protocol.

FIG. 5 shows a data packet format of the BR/EDR protocol. As shown in FIG. 5, a Bluetooth data packet based on the BR/EDR protocol includes a packet header and a payload of the data packet. The packet header includes a type field, for example, a TYPE field.

For compatibility with the standard Bluetooth protocol, in embodiments of the present disclosure, in a packet header of a BR-based Bluetooth data packet, a TYPE field is used to indicate whether polar encoding is performed on a subsequent payload.

Figure 6:
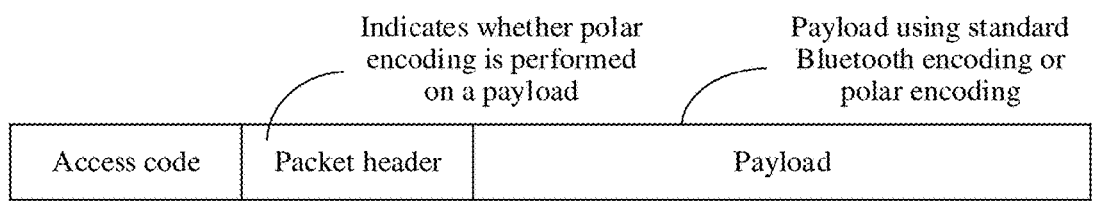
FIG. 6 is a schematic diagram of extending support for polar encoding in a BR protocol-based Bluetooth data packet format according to an embodiment of the present disclosure.

FIG. 6 is a schematic diagram of extending support for polar encoding in a BR protocol-based Bluetooth data packet format according to an embodiment of the present disclosure. If a transmit end performs polar encoding on a payload, a packet header is used to indicate that polar encoding is performed on the payload. Alternatively, if the transmit end encodes the payload by using a standard BR protocol, the packet header is used to indicate that polar encoding is not performed on the payload.

A TYPE field in the packet header is used to indicate a type of a data packet. Different data packet types correspond to different encoding schemes or different cases of whether encoding is performed, as shown in the following Table 1.

Figure 7:
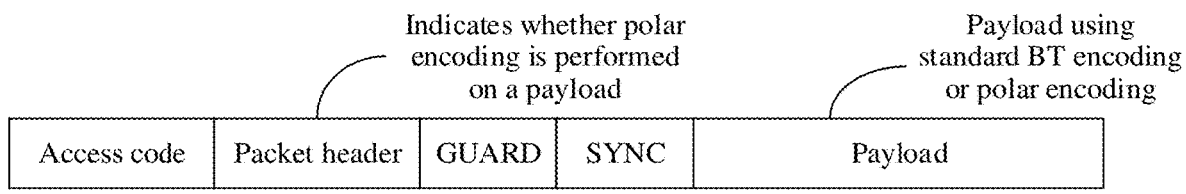
FIG. 7 is a schematic diagram of extending support for polar encoding in an EDR protocol-based Bluetooth data packet format according to an embodiment of the present disclosure.

FIG. 7 is a schematic diagram of extending support for polar encoding in an EDR protocol-based Bluetooth data packet format according to an embodiment of the present disclosure. As shown in FIG. 7, compared with the BR protocol-based Bluetooth data packet format, two fields are added to the EDR protocol-based Bluetooth data packet format: guard and sync. Likewise, a packet header is used to indicate whether polar encoding is performed on a payload. A transmit end performs indication by using a type field in the packet header.

To add an indication for a polar data packet, a current standard Bluetooth protocol data packet type needs to be extended, as shown in Table 1.

TABLE 1

| Segment | TYPE code $b_3b_2b_1b_0$ | Slot occupancy | SCO logical transport (1 Mb/s) | eSCO logical transport (1 Mb/s) | eSCO logical transport (2-3 Mb/s) | ACL logical transport (1 Mb/s) ptt = 0 | ACL logical transport (2-3 Mb/s) ptt = 1 | ACL logical transport (1 Mb/s) ptt = 2 | ACL logical transport (2-3 Mb/s) ptt = 3 | CSB logical transport (1 Mb/s) | CSB logical transport (2-3 Mb/s) |
|---|---|---|---|---|---|---|---|---|---|---|---|
| 1 | 0000 | 1 | NULL | NULL | NULL | NULL | NULL | NULL | NULL | NULL | NULL |
|   | 0001 | 1 | POLL | POLL | POLL | POLL | POLL | POLL | POLL | — | — |

TABLE 1-continued

| Segment | TYPE code $b_3b_2b_1b_0$ | Slot occupancy | SCO logical transport (1 Mb/s) | eSCO logical transport (1 Mb/s) | eSCO logical transport (2-3 Mb/s) | ACL logical transport (1 Mb/s) ptt = 0 | ACL logical transport (2-3 Mb/s) ptt = 1 | ACL logical transport (1 Mb/s) ptt = 2 | ACL logical transport (2-3 Mb/s) ptt = 3 | CSB logical transport (1 Mb/s) | CSB logical transport (2-3 Mb/s) |
|---|---|---|---|---|---|---|---|---|---|---|---|
|   | 0010 | 1 | FHS | — | — | FHS | FHS | FHS | FHS | — | — |
|   | 0011 | 1 | DM1 | — | — | DM1 | DM1 | DM1 | DM1 | DM1 | DM1 |
| 2 | 0100 | 1 | — | — | — | DH1 | 2-DH1 | DH1-polar | 2-DH1-polar | DH1 | 2-DH1 |
|   | 0101 | 1 | HV1 | — | 2-EV3-polar | — | — | — | — | — | — |
|   | 0110 | 1 | HV2 | — | 2-EV3 | — | — | — | — | — | — |
|   | 0111 | 1 | HV3 | EV3 | 3-EV3 | — | — | — | — | — | — |
|   | 1000 | 1 | DV | — | — | — | 3-DH1 | — | 3-DH1-polar | — | 3-DH1 |
|   | 1001 | 1 | HV3-polar | EV3-polar | 3-EV3-polar | AUX 1 | AUX 1 | AUX 1 | AUX 1 | — | — |
| 3 | 1010 | 3 | — | — | 2-EV5-polar | DM3 | 2-DH3 | DM3 | 2-DH3-polar | DM3 | 2-DH3 |
|   | 1011 | 3 | — | EV5-polar | 3-EV5-polar | DH3 | 3-DH3 | DH3-polar | 3-DH3-polar | DH3 | 3-DH3 |
|   | 1100 | 3 | — | EV4 | 2-EV5 | — | — | — | — | — | — |
|   | 1101 | 3 | — | EV5 | 3-EV5 | — | — | — | — | — | — |
| 4 | 1110 | 5 | — | — | — | DM5 | 2-DH5 | DM5 | 2-DH5-polar | DM5 | 2-DH5 |
|   | 1111 | 5 | — | — | — | DH5 | 3-DH5 | DH5-polar | 3-DH5-polar | DH5 | 3-DH5 |

Table 1 shows a synchronous connection-oriented (SCO) logical link, an extended synchronous connection-oriented (eSCO) logical link, an asynchronous connection-oriented (ACL) logical link, and a connectionless slave broadcast (CSB) logical link. A column corresponding to 1 Mb/s indicates a data packet type using a BR PHY protocol, and a column corresponding to 2-3 Mb/s indicates a data packet type using an EDR PHY protocol.

To indicate different data packets on one logical link, a 4-bit TYPE code (for example, $b_3b_2b_1b_0$ in Table 1) is used in a Bluetooth baseband protocol. A data packet type is divided into four segments (for example, segments 1, 2, 3, and 4 in Table 1), and each segment corresponds to a corresponding slot occupancy status. The first segment is reserved for a control data packet, and all control data packets occupy one slot. The second segment is reserved for a data packet that occupies one slot. The third segment is reserved for a data packet that occupies three slots. The fourth segment is reserved for a data packet that occupies five slots. Table 1 shows data packets defined for the SCO link, the eSCO link, the ACL link, and the CSB link. The dash "—" in Table 1 indicates reservation.

In addition, in Table 1, a data packet type with the suffix "-polar" is a data packet type that is extended in embodiments of the present disclosure and that supports polar encoding/decoding, that is, an extended Bluetooth data packet.

For example, a fixed length and bit rate are used for a data packet of an extended Bluetooth data packet type (for example, HV3-polar) on the SCO logical link. For example, an HV3-polar data packet has a fixed length of 256 bits and a bit rate of 2. A packet length and a bit rate of an extended Bluetooth data packet on the eSCO logical link are determined through negotiation by using an LMP management packet when two Bluetooth nodes establish the logical link. After the packet length and the bit rate are determined through negotiation and before the link is removed, both Bluetooth devices use the packet length and the bit rate that are determined through negotiation. In addition, an extended Bluetooth data packet type on the ACL logical link is negotiated upon by two Bluetooth nodes in a packet type mapping parameter in link management protocol (LMP) signaling used for establishing the logical link.

Optionally, in an example, the packet type mapping parameter may be a packet type table (PTT) parameter. In embodiments of the present disclosure, a value of the PTT field is extended to support polar encoding. As shown in Table 2, two Bluetooth nodes that have established a Bluetooth link may determine, by negotiating upon the value of the PTT field by using LMP signaling, that a row of ptt=0, ptt=1, ptt=2, or ptt=3 in Table 2 is used for the ACL link, to be specific, a data packet type corresponding to one of the rows is selected. A definition of the PTT field is shown in Table 2.

TABLE 2

| Value of the PTT field | Definition | Remarks |
|---|---|---|
| 0 | 1 Mb/s BR PHY | Definition in the standard Bluetooth protocol |

TABLE 2-continued

| Value of the PTT field | Definition | Remarks |
| --- | --- | --- |
| 1 | 2-3 Mb/s EDR PHY | Definition in the standard Bluetooth protocol |
| 2 (First extended value) | 1 Mb/s BR polar PHY | Extended definition |
| 3 (Second extended value) | 2-3 Mb/s EDR polar PHY | Extended definition |
| 4 to 255 | Reserved | |

In Table 2, when the value of the PTT field is 2 or 3, polar encoding is supported for a BR-based data packet type or polar encoding is supported for an EDR-based data packet type. Values of the first extended value and the second extended value are merely examples, and other values may be alternatively used. In addition, during actual use, extension may be alternatively performed only for the 1 Mb/s BR polar PHY or the 2-3 Mb/s EDR polar PHY, that is, one of them is extended. This is not limited in embodiments of the present disclosure.

Extended content shown in Table 1 and Table 2 is merely an example of extending a data packet type supporting polar encoding. To be specific, a data packet type supporting polar FEC is extended by using a definition of a TYPE field in a data packet header and a value of a PTT field used when a logical link is established by using LMP signaling.

The following describes processing of a data packet on each logical link.

(1) Processing of a Common Data Packet

Types of common data packets on the foregoing logical links include ID, NULL, POLL, FHS, and DM1. To maintain compatibility with the standard Bluetooth protocol, processing processes in the standard Bluetooth protocol are maintained for these common data packets.

(2) Processing of a Dedicated Data Packet of the SCO Logical Link

Types of dedicated data packets on the SCO logical link include HV1, HV2, HV3, and DV. Among these types of data packets, only HV3 does not have FEC protection. Therefore, an HV3-polar data packet type with TYPE=1001 is extended, as shown in Table 1.

As described above, a packet length of a data packet on the SCO logical link is a fixed length, and is determined when the logical link is established. In embodiments of the present disclosure, a packet length of an extended Bluetooth data packet on the SCO logical link is also a fixed length.

A payload of an HV3 data packet in the standard Bluetooth protocol has a fixed length of 240 bits. Considering a feature of polar encoding, for example, a length of an HV3-polar data packet is defined to be 256 bits. When a bit rate of 1⁄2 is used, effective information bits are 128 bits (16 bytes).

It should be noted that the bit rate of 2 is merely used as an example, and another bit rate may be alternatively defined for the HV3-polar data packet. For example, when the length of the payload is 256 bits, if a bit rate of 5/8 is used, effective information bits are 160 bits (20 bytes), equivalent to a quantity of effective information bits of a data packet of an HV2 type.

In addition, in this embodiment, extension of an HV3 data packet without FEC protection is merely used as an example. Alternatively, HV1, HV2, and DV with FEC protection may be extended to support polar encoding. This is not limited in embodiments of the present disclosure.

(3) Processing of a Dedicated Data Packet of the eSCO Logical Link

Types of BR protocol-based dedicated data packets on the eSCO link include EV3, EV4, and EV5. Among these types of data packets, EV4 has FEC protection. Therefore, an EV3-polar data packet type with TYPE=1001 and an EV5-polar data packet type with TYPE=1011 are extended.

Lengths of payloads of EV3, EV4, EV5, EV3-polar, and EV5-polar data packets are determined by Bluetooth nodes through negotiation when establishing an eSCO link connection. For extended EV3-polar and EV5-polar data packets, the Bluetooth nodes further need to negotiate upon an effective information length, namely, FEC bit rate information, of the data packets.

When the Bluetooth nodes perform negotiation by using LMP signaling, extended definitions of data packet types on the eSCO logical link may be some or all of definitions shown in Table 3.

TABLE 3

| Value of a packet type | Data packet type | Remarks |
| --- | --- | --- |
| 0x00 | NULL/POLL | Definition in the standard Bluetooth protocol |
| 0x07 | EV3 | Definition in the standard Bluetooth protocol |
| 0x0C | EV4 | Definition in the standard Bluetooth protocol |
| 0x0D | EV5 | Definition in the standard Bluetooth protocol |
| 0x26 | 2-EV3 | Definition in the standard Bluetooth protocol |
| 0x2C | 2-EV5 | Definition in the standard Bluetooth protocol |
| 0x37 | 3-EV3 | Definition in the standard Bluetooth protocol |
| 0x3D | 3-EV5 | Definition in the standard Bluetooth protocol |
| 0x09 | EV3-polar | Extended definition |
| 0x0B | EV5-polar | Extended definition |
| 0x25 | 2-EV3-polar | Extended definition |
| 0x2A | 2-EV5-polar | Extended definition |
| 0x39 | 3-EV3-polar | Extended definition |
| 0x3B | 3-EV5-polar | Extended definition |
| Others | Reserved | |

In addition, EDR protocol-based dedicated data packet types on the eSCO logical link include 2-EV3, 2-EV5, 3-EV3, and 3-EV5, and none of the four types of data packets has FEC protection. Therefore, TYPE=0101, TYPE=1010, TYPE=1001, and TYPE=1011 are extended, and correspond to data packet types 2-EV3-polar, 2-EV5-polar, 3-EV3-polar, and 3-EV5-polar respectively.

Similar to the descriptions of Table 1 and Table 2, the correspondence, shown in Table 3, between a value of a packet type and a data packet type supporting polar FEC is merely used as an example. In addition, during actual use, only some but not all of the data packet types supporting polar FEC in Table 3 may be used.

Payload lengths and effective information lengths of the foregoing extended data types are negotiated upon by Bluetooth nodes by using LMP signaling when establishing an eSCO logical link connection.

(4) Processing of a Dedicated Data Packet of the ACL Logical Link

A data packet on the ACL logical link is extended by using a PTT field.

For BR PHY-based dedicated packet types DH1, DH3, DH5, DM3, DM5, and AUX1 on the ACL link, DM3 and DM5 of the six data packet types have FEC protection, and an AUX1 data packet is used in a test mode. Therefore, only DH1-polar, DH3-polar, and DH5-polar are extended, as shown in Table 1.

For EDR PHY-based dedicated data packet types 2-DH1, 2-DH3, 2-DH5, 3-DH1, 3-DH3, 3-DH5, and AUX1 on the ACL link, none of the seven types of data packets, except the AUX1 used in a test mode, has FEC protection. Therefore, 2-DH1-polar, 2-DH3-polar, 2-DH5-polar, 3-DH1-polar, 3-DH3-polar, and 3-DH5-polar are extended, as shown in Table 1.

It should be noted that, in this embodiment, only a data packet without FEC protection among the data packet types shown in Table 1 is extended to support polar FEC. This is merely an implementation. In other words, the extended data packet types supporting polar FEC in Table 1 are merely examples. During actual use, only some of the data packet types supporting polar FEC in Table 1 may be used, or a reserved data packet type may be extended, or the like. Alternatively, optionally, a person skilled in the art may further extend a data packet type with FEC protection according to a design idea provided in embodiments of the present disclosure. For example, FEC protection by using a Hamming code or a CC code in Table 1 is extended to FEC protection by using a polar code, to improve an anti-interference capability. Therefore, various types of Bluetooth data packets on the logical links (for example, the CSB logical link) shown in Table 1 may be extended as required to support polar FEC.

In addition, a payload of a data packet on the ACL logical link includes a payload header (referred to as a payload header below) and payload data (referred to as payload data or a payload body below).

Figure 8:
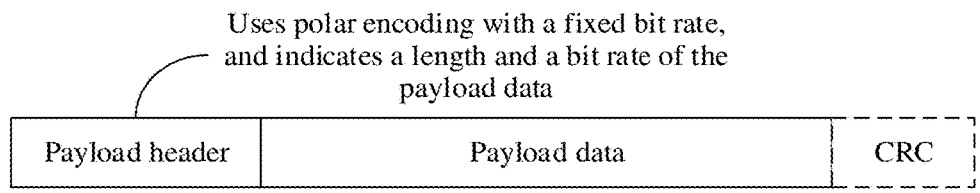
FIG. 8 shows an example of a polar encoding scheme of a data packet on an ACL logical link according to tan embodiment of the present disclosure.

FIG. 8 shows an example of a polar encoding scheme of a data packet on an ACL logical link according to an embodiment of the present disclosure. As shown in FIG. 8, a payload header of the data packet on the ACL logical link is encoded separately, and a length and a bit rate of subsequent payload data are indicated in the payload header. Polar encoding with a variable bit rate is performed on the payload data.

Figure 9:
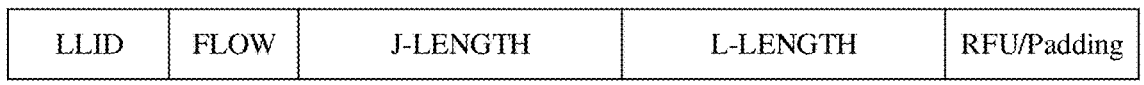
FIG. 9 shows a frame format of an ACL payload header according to an embodiment of the present disclosure.

In addition, FIG. 9 shows a frame format of an ACL payload header according to an embodiment of the present disclosure. As shown in FIG. 9, the ACL payload header (32 bits) is defined as follows:
  (a) Logical link identifier (LLID): Alength is 2 bits, and a definition of content is the same as that in a standard asynchronous packet payload header. However, in a payload data header of a synchronous packet, a value of the LLID is 00 in a binary system.
  (b) Flow: a flow control flag. A length is 1 bit, and a definition of content is the same as that in a standard asynchronous packet payload header. However, in a synchronous packet, a value of the Flow is 0 in a binary system.
  (c) J-Length: A length is 10 bits, and is an original information length of payload data. The length does not include the payload header, 32-bit message integrity check (MIC), and 32-bit cyclic redundancy check (CRC).
  (d) L-Length: A length is 10 bits, and is a length of payload data encoded by using a polar code. The length does not include a length of the payload header, but includes the MIC (32 bits) and the CRC (32 bits).
  (e) Reserved for future use (RFU): padding data with a length of 9 bits and reserved for future application.

Figure 10:
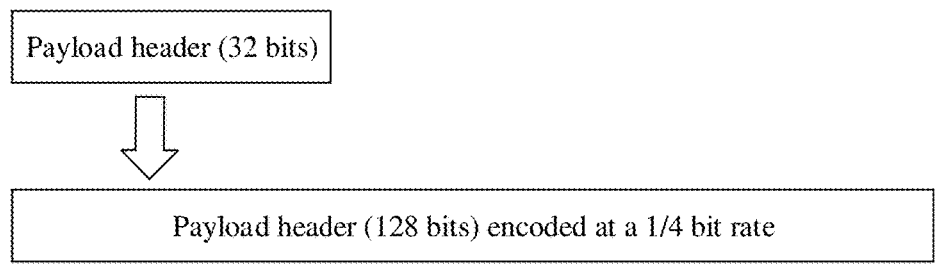
FIG. 10 is a schematic diagram of performing polar encoding on an ACL payload header.

For example, it is assumed that a transmit end separately encodes a payload header of an ACL data packet by using a fixed bit rate (for example, 1/4), as shown in FIG. 10. FIG. 10 is a schematic diagram of performing polar encoding on an ACL payload header. An encoded payload header includes 128 bits.

After decoding content of the payload header at a bit rate of 1/4 by using a polar code decoding method, a receive end may learn of a length and a bit rate of payload data that are indicated in the payload header.

The first Bluetooth node separately encodes the payload header by using a fixed bit rate, thereby helping reduce signaling overheads of bit rate negotiation between Bluetooth nodes.

In addition, the payload header is more important than the payload data, and therefore the payload header is encoded by using a lower bit rate.

The foregoing describes the extension of the BR/EDR-based Bluetooth baseband protocol. The following describes extension of the LE-based Bluetooth baseband protocol.

2. Extension of the LE-Based Bluetooth Protocol

The LE-based Bluetooth protocol includes two underlying layers: an uncoded physical layer (uncoded PHY) and a coded physical layer (coded PHY).

Figure 11:
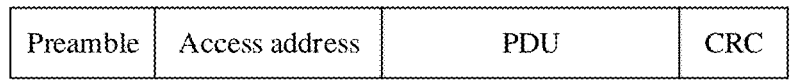
FIG. 11 shows a data packet format of a standard LE protocol.
Figure 11:
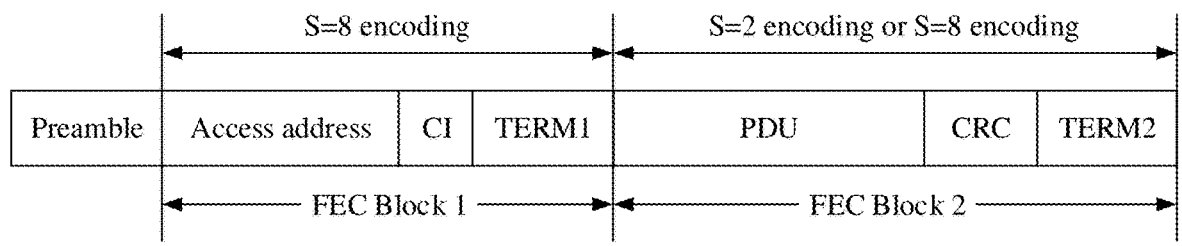

FIG. 11 shows a data packet format of a standard BLE protocol. As shown in (a) of FIG. 11, an uncoded physical layer data packet of the LE protocol includes a preamble, an access address, a protocol data unit (PDU), and CRC.

As shown in (b) of FIG. 11, a coded physical layer data packet of the LE protocol has FEC protection, and includes a preamble, an FEC block 1, and an FEC block 2. The FEC block 1 includes an access address, a coding indicator (CI), and TERM1. The FEC block 2 includes a PDU, CRC, and TERM2. TERM1 and TERM2 are FEC algorithm terminators.

As shown in (b) of FIG. 11, an encoding algorithm with S=8 is used for the FEC block 1, and an encoding algorithm with S=2 or S=8 is used for the FEC block 2 based on a value of the CI field. Refer to the descriptions of the pattern mapping in FIG. 4.

In the standard LE protocol, if CI=0, encoding with S=8 is performed on the FEC block 2; or if CI=1, encoding with S=2 is performed on the FEC block 2.

In this embodiment, a definition of the CI field is extended, so that the CI field of the FEC block 1 indicates an encoding scheme of the FEC block 2. A definition of an extended CI field is shown in Table 4.

TABLE 4

| CI | Meaning |
| --- | --- |
| 00 | Encoding with S = 8 is performed on the FEC block 2 |
| 01 | Encoding with S = 2 is performed on the FEC block 2 |
| 10 (Third extended value) | S = 8 and polar encoding are used for the FEC block 2 (extended definition). |
| 11 (Fourth extended value) | S = 2 and polar encoding are used for the FEC block 2 (extended definition). |

Definitions of fields other than the CI field in the FEC block 1 are the same as those in the standard LE protocol.

In Table 4, values of the third extended value and the fourth extended value of the CI field are merely examples, and other values may be alternatively used. In addition, during actual use, alternatively, only one of using S=8 and polar encoding for the FEC block 2 or using S=2 and polar encoding for the FEC block 2 may be extended. This is not limited in embodiments of the present disclosure.

In addition, for the third extended value and the fourth extended value of the CI, a transmit end first performs polar FEC encoding on payload data, and then performs symbol mapping with S=2 or S=8. The symbol mapping and the polar FEC are independent of each other.

Figure 12:
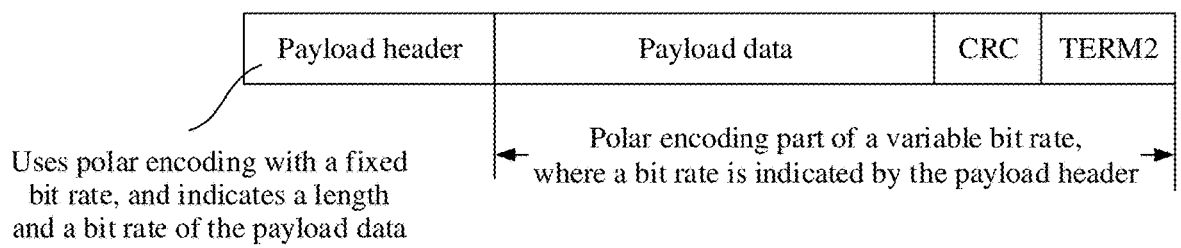
FIG. 12 shows a format of an FEC block 2 according to an embodiment of the present disclosure.

Further, when the value of the CI field is 10 or 11, a data packet format of the FEC block 2 corresponds to the encoding scheme shown in Table 4. FIG. 12 is a format of an FEC block 2 according to embodiments of the present disclosure. As shown in FIG. 12, polar encoding with a fixed bit rate may be performed on a payload header, and the payload header is used to indicate a length and a bit rate of subsequent payload data. Polar encoding with a variable bit rate is performed on the payload data, CRC, and TERM2 other than the payload header in the FEC block 2, where a bit rate is indicated in the payload header. Currently, the payload header may have two lengths: 24 bits and 32 bits.

For example, in embodiments of the present disclosure, a length of the payload header is extended to 32 bits.

Figure 13:
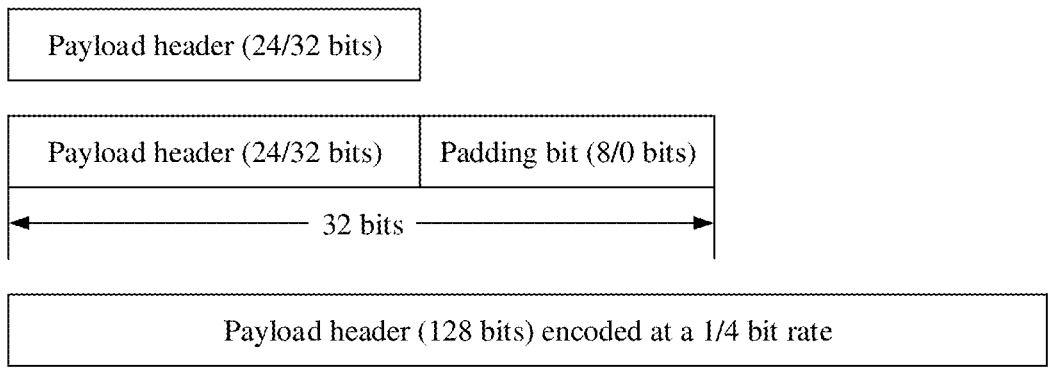
FIG. 13 is a schematic diagram of separately performing polar encoding on a payload header in an FEC block 2 by using a fixed bit rate.
Figure 14:
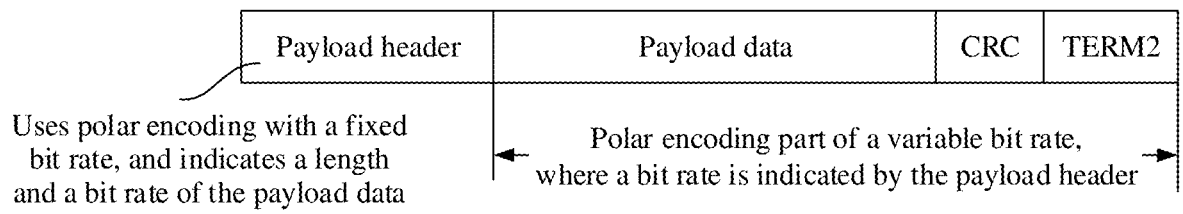
FIG. 14 is a schematic diagram of indicating a length and a bit rate of payload data by using a payload header.

It is assumed that polar encoding is performed on the payload header by using a fixed bit rate of 1/4. For a payload header with a length of 24 bits, a transmit end first fills the payload header into 32 bits in a padding manner of adding 0, and then encodes a 32-bit payload header by using a polar code with a bit rate of 1/4 and a code length of 128. The transmit end may directly encode the payload header with a length of 32 bits by using a polar code with a bit rate of 1/4 and a code length of 128, as shown in FIG. 13 and FIG. 14. FIG. 13 is a schematic diagram of separately performing polar encoding on a payload header in an FEC block 2 by using a fixed bit rate. FIG. 14 is a schematic diagram of indicating a length and a bit rate of a payload by using a payload header.

Optionally, in an encoding process, different bits in the payload header are of different importance. For example, bits in the payload header that are used to indicate a payload data length and an effective information length need to be protected at a higher priority. A transmit end may place, at locations of information bits with higher reliability in a polar channel, bits in the payload header that are used to indicate the payload data length and the effective information length. Polar FEC encoding has a function of distinguishing between importance of bits, and is more suitable for a Bluetooth data packet.

Further, PDUs in the FEC block 2 may be classified into PDUs transmitted on an advertising physical channel and PDUs transmitted on a data physical channel. Therefore, the following describes payload header designs separately by using a PDU transmitted in an advertising physical channel and a PDU transmitted in a data physical channel.

Figure 15:
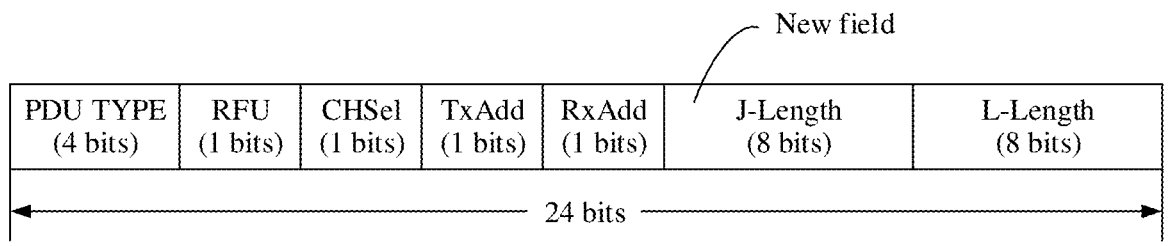
FIG. 15 shows an extended structure of a payload header of a BLE advertising physical channel according to an embodiment of the present disclosure.

FIG. 15 shows an extended structure of a payload of a BLE advertising physical channel according to an embodiment of the present disclosure. As shown in FIG. 15, a length of a payload header of an advertising physical channel defined in the standard LE protocol is 16 bits. For example, an 8-bit "J-Length" field is added in the present disclosure, to extend the payload header to 24 bits. Meanings of fields are as follows:

(a) Definitions of PDU Type, RFU, ChSel, TxAdd, and RxAdd are the same as those in the standard BLE protocol.

The RFU field is not defined currently, and is used for subsequent extension of the protocol, and a length is 1 bit. ChSel indicates channel selection, and a length is 1 bit. TxAdd indicates an address type of a broadcast device, and a length is 1 bit. RxAdd indicates an address type of a target device, and a length is 1 bit.

(b) J-Length has a length of 8 bits, and is used to indicate an original information length of payload data, and a unit is byte. The length does not include a length of the payload header, and is a total length of original information of the payload data, 24-bit CRC, and TERM2.

(c) L-Length has a length of 8 bits, and is a length of payload data, 24-bit CRC, and TERM2 that are encoded by using a polar code, and a unit is byte.

In the advertising physical channel, polar encoding and decoding are performed on a data part after the payload header, that is, the payload data, 24-bit CRC, and TERM2, based on a bit rate determined by J-Length and L-Length in the payload header. The bit rate is J/L.

Figure 16:
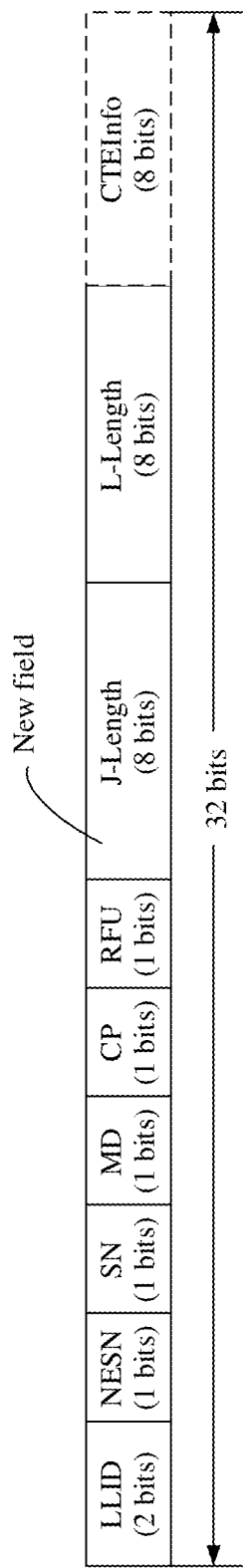
FIG. 16 shows an extended structure of a payload header of a BLE data physical channel according to an embodiment of the present disclosure.

FIG. 16 shows an extended structure of a payload of a BLE data physical channel according to an embodiment of the present disclosure. As shown in FIG. 16, a length of a payload header of a data physical channel defined in the standard LE protocol is 24 bits. For example, an 8-bit "J-Length" field is added in this embodiment, to extend the payload header to 32 bits. A field in a dashed-line box indicates an optional field. Meanings of fields are as follows:

(a) Definitions of LLID, NESN, SN, MD, CP, RFU, and optional CTEInfo are the same as those in the standard LE protocol.

(b) J-Length has a length of 8 bits, and is an original information length of payload data, and a unit is byte. The length does not include the payload header, and is a total length of original information of the payload data, 24-bit CRC, and TERM2.

(c) L-Length has a length of 8 bits, and is a length of payload data, 24-bit CRC, and TERM2 that are encoded by using a polar code, and a unit is byte.

In the data physical channel, polar encoding and decoding are performed on a data part after the payload header, that is, the payload data, 24-bit CRC, and TERM2, based on a bit rate determined by J-Length and L-Length in the payload header. The bit rate is J/L.

It should be noted that, that the J-Length field added to the standard BLE protocol in FIG. and FIG. 16 is used to indicate the original information length of the data part in the FEC block 2 is merely used as an example.

For example, in the extended Bluetooth baseband protocol, a field may be alternatively added to the 16-bit or 24-bit payload header to directly indicate a bit rate of a data part. For example, the "J-Length" field in FIG. 15 or FIG. 16 is replaced with a 4-bit "bit rate" field to indicate a bit rate of a data part other than the payload header in the PDU. This is not limited in embodiments of the present disclosure.

Alternatively, for example, in the extended Bluetooth baseband protocol, a field may be alternatively added to the 16-bit or 24-bit payload header to indicate a bit rate of a data part and a segment used for encoding or decoding. For example, the added field includes a total of 8 bits, where 4 most significant bits are used to indicate the bit rate of the data part, and 4 least significant bits are used to indicate a length of the segment used for encoding or decoding the data part.

The foregoing describes the extension of the standard BR/EDR protocol and LE protocol in detail. Based on the foregoing extension, bits of different importance in a Bluetooth data packet can be protected differently by using a polar code, thereby improving demodulation performance of a Bluetooth receiver.

In addition, the extended LE protocol supports polar encoding on a basis of supporting original CC encoding with a specific constraint length (for example, the constraint length is 4), thereby enhancing demodulation performance of a receiver of the LE protocol, and improving an anti-interference capability or further increasing a coverage distance of a Bluetooth signal of the LE protocol.

Two Bluetooth nodes perform feature negotiation in a process of establishing a Bluetooth connection. By exchanging feature information, an initiator and a responder of the Bluetooth connection may determine capabilities of each other. In this embodiment, support for polar encoding/decoding is added to a link manager (LM) layer and a link control (LC) layer of the standard Bluetooth protocol. When performing feature negotiation in the process of establishing the Bluetooth connection, the two Bluetooth nodes notify each other of their polar encoding/decoding support statuses at a protocol layer.

Figure 17:
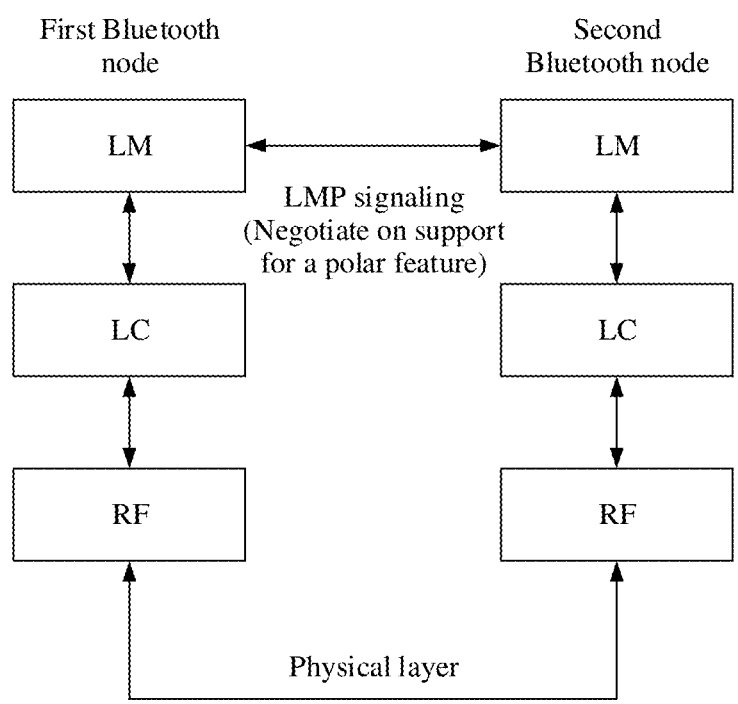
FIG. 17 is a schematic diagram of exchanging a polar feature support status between Bluetooth nodes.

FIG. 17 is a schematic diagram of exchanging a polar feature support status between Bluetooth nodes. A polar feature indicates whether polar encoding/decoding is supported.

The standard Bluetooth protocol defines three feature mask tables to indicate features supported by a Bluetooth device. The three feature mask tables are a feature mask page 0, a feature mask page 1, and a feature mask page 2. For example, in the page 0, each bit represents one feature, where 1 indicates that the feature is supported, and 0 indicates that the feature is not supported.

For example, in an implementation, when performing feature negotiation, the Bluetooth nodes may exchange their respective polar feature support statuses by using a reserved bit in the feature mask page 0, the feature mask page 1, or the feature mask page 2.

Alternatively, a size of the feature mask page 0, the feature mask page 1, or the feature mask page 2 is extended, and a value of an added bit is used to negotiate upon a polar feature support status.

Alternatively, in another implementation, a new feature mask table may be extended. It is assumed that the new feature mask table is denoted as a feature mask page 3. The Bluetooth nodes negotiate upon their respective polar feature support statuses by using the feature mask page 3. Alternatively, the Bluetooth nodes first negotiate upon support for the feature mask page 3 by using a reserved bit in the feature mask page 0, the feature mask page 1, or the feature mask page 2. When both Bluetooth nodes support the feature mask page 3, the Bluetooth nodes negotiate, by using the feature mask page 3, upon whether they support polar encoding/decoding.

The Bluetooth nodes negotiate with each other upon a polar code support status when establishing a connection. After two Bluetooth nodes that support polar encoding/decoding are paired and establish a connection, an underlying function of performing FEC protection by using a polar code is added between the two Bluetooth nodes, so that encoding and decoding performance can be improved. Certainly, after a Bluetooth node that does not support polar encoding/decoding and another Bluetooth node that supports polar encoding/decoding are paired and establish a connection, communication may be performed by using the standard Bluetooth protocol.

The foregoing describes in detail the method for processing a Bluetooth data packet according to embodiments of the present disclosure.

Figure 18:
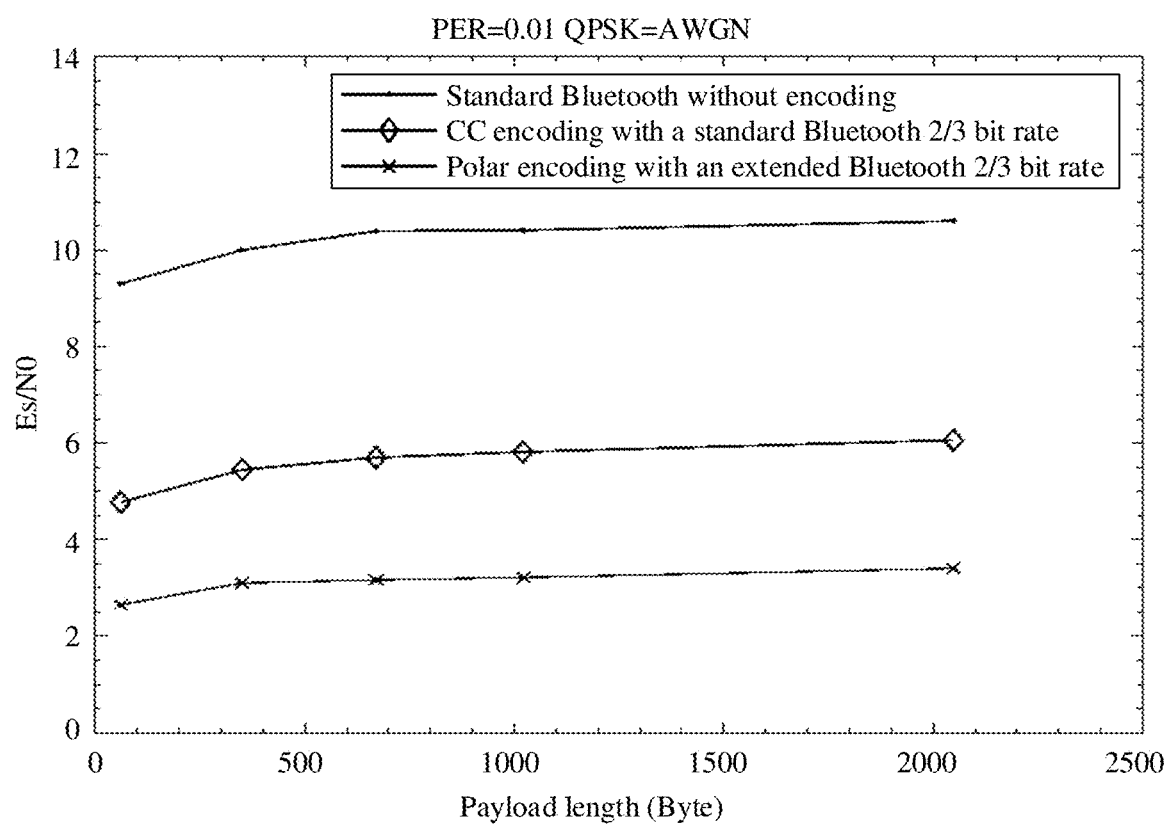
FIG. 18 is a diagram of comparison between demodulation performance achieved when no encoding is performed, CC encoding is performed, and polar encoding in this application is performed during Bluetooth QPSK modulation.

FIG. 18 is a diagram of comparison between demodulation performance achieved when no encoding is performed, CC encoding is performed, and polar encoding in embodiments of the present disclosure is performed during Bluetooth QPSK modulation. As shown in FIG. 18, in a simulation environment in which quadrature phase shift keying (QPSK) and additive white Gaussian noise (AGWN) are used, compared with demodulation performance of the standard Bluetooth protocol without encoding and demodulation performance of the standard Bluetooth protocol with encoding by using a CC code, demodulation performance of the extended Bluetooth protocol with polar encoding in solutions of the present disclosure is significantly higher than that in the foregoing two cases.

In view of improvement of demodulation performance, an anti-interference capability of a Bluetooth system is improved, and reception sensitivity of a Bluetooth receiver is improved, so that a Bluetooth signal can cover a longer distance. In addition, a polar decoder may perform decoding by using a low-complexity successive cancellation (SC) decoding scheme, and therefore is more suitable for a Bluetooth low energy application scenario.

The following describes an example communication apparatus provided in the present disclosure.

Figure 19:
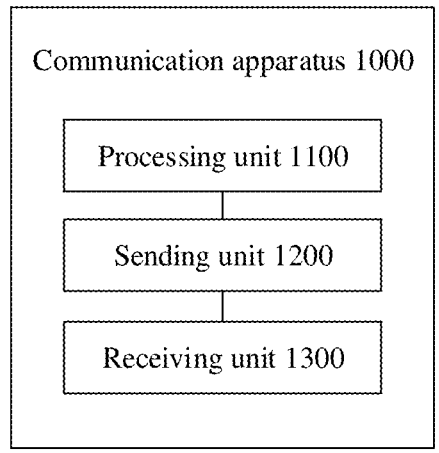
FIG. 19 is a schematic block diagram of a communication apparatus according to an embodiment of the present disclosure.

FIG. 19 is a schematic block diagram of a communication apparatus according to an embodiment of the present disclosure. As shown in FIG. 19, the communication apparatus 1000 includes a processing unit 1100, a sending unit 1200, and a receiving unit 1300.

The processing unit 1100 is configured to:
obtain a bit stream of a to-be-sent payload;
determine an encoding scheme, where the encoding scheme is polar encoding or standard Bluetooth encoding; and
when the determined encoding scheme is the polar encoding, perform polar encoding on the bit stream of the payload according to an extended Bluetooth baseband protocol, to obtain an extended Bluetooth data packet, where the extended Bluetooth baseband protocol supports the polar encoding scheme.

The sending unit 1200 is configured to send the extended Bluetooth data packet to a second Bluetooth node that has established a Bluetooth connection to the communication apparatus.

Optionally, in an embodiment, the extended Bluetooth baseband protocol is an extended BR baseband protocol or an extended EDR baseband protocol.

In the extended BR baseband protocol or the extended EDR baseband protocol, the extended Bluetooth data packet includes a data packet header and the payload, the data packet header includes a type field, and the type field is used to indicate an encoding scheme of the payload.

Optionally, in an embodiment, the extended Bluetooth data packet includes one or more of:
an HV3 data packet of an SCO logical link;
an EV3 data packet and an EV5 data packet of an eSCO logical link;
a 2-EV3 data packet, a 2-EV5 data packet, a 3-EV3 data packet, and a 3-EV5 data packet of the eSCO logical link; or
a DH1 data packet, a DH3 data packet, and a DH5 data packet of an ACL logical link.

Optionally, in an embodiment, if a type of the extended Bluetooth data packet is a data packet of the eSCO logical link, a length and/or a bit rate of the extended Bluetooth data packet are determined through negotiation when the communication apparatus and the second Bluetooth node establish the eSCO logical link.

Optionally, in an embodiment, if a type of the extended Bluetooth data packet is a data packet of the ACL logical link, LMP signaling used for feature negotiation between the communication apparatus and the second Bluetooth node includes a packet type mapping parameter. The packet type mapping parameter is used to negotiate upon the type of the extended Bluetooth data packet transmitted on the ACL logical link.

Optionally, in an embodiment, the packet type mapping parameter includes a first extended value and/or a second extended value. The first extended value is used to indicate that the extended Bluetooth data packet transmitted on the ACL logical link is a Bluetooth data packet based on the extended BR baseband protocol. The second extended value is used to indicate that the extended Bluetooth data packet transmitted on the ACL logical link is a Bluetooth data packet based on the extended EDR baseband protocol.

Optionally, in an embodiment, a payload of the extended Bluetooth data packet transmitted on the ACL logical link includes a payload header and payload data, and the processing unit 1100 is further configured to:

perform polar encoding on the payload header by using a fixed bit rate, where the payload header is used to indicate a length and/or a bit rate of the payload data.

Optionally, in an embodiment, the extended Bluetooth baseband protocol is an extended low energy (LE) baseband protocol.

In the extended LE baseband protocol, the extended Bluetooth data packet includes a preamble, a first FEC block, and a second FEC block, the first FEC block includes a coding indicator (CI) field, the second FEC block includes the payload, and an extended value of the CI field is used to indicate the polar encoding scheme of the second FEC block.

Optionally, in an embodiment, the CI field includes a third extended value and/or a fourth extended value, where the third extended value is used to indicate that an encoding scheme with S=8 and the polar encoding scheme are used for the second FEC block, and the fourth extended value is used to indicate that an encoding scheme with S=2 and the polar encoding scheme are used for the second FEC block.

Optionally, in an embodiment, a payload of the second FEC block includes a payload header and payload data, where polar encoding with a fixed bit rate is performed on the payload header, and the payload header is used to indicate a length and/or a bit rate of the payload data.

Optionally, in an embodiment, the payload header includes a first length field and a second length field, where the first length field is used to indicate an original information length of the second FEC block, the second length field is used to indicate a length of an encoded second FEC block, and the original information length of the second FEC block does not include a length of the payload header; or the first length field is used to indicate a bit rate of the second FEC block, and the second length field is used to indicate a length of an encoded second FEC block.

Optionally, in an embodiment, the extended Bluetooth data packet is a data packet, based on the extended LE baseband protocol, of an advertising physical channel or a data physical channel.

Optionally, in an embodiment, the sending unit 1200 is further configured to:

send a first LMP message to the second Bluetooth node, where the first LMP message is used to request to perform feature exchange with the second Bluetooth node, and the first LMP message carries a polar encoding scheme support feature of the communication apparatus; the receiving unit 1300 is configured to:

receive, from the second Bluetooth node, a second LMP message used to respond to the first LMP message, where the second LMP message carries a polar encoding scheme support feature of the second Bluetooth node; and the processing unit 1100 is further configured to obtain, based on the second LMP message, the polar encoding scheme support feature of the second Bluetooth node.

Optionally, in an embodiment, the processing unit 1100 is configured to:

based on the polar encoding scheme support feature of each of the communication apparatus and the second Bluetooth node, when determining that the communication apparatus supports the polar encoding scheme and the second Bluetooth node supports the polar encoding scheme, determine that the encoding scheme is the polar encoding.

Optionally, in an embodiment, the extended Bluetooth baseband protocol includes an extended feature mask table, and the extended feature mask table includes one of the following cases: the extended feature mask table is a feature mask page 0, a feature mask page 1, or a feature mask page 2, and a reserved bit or an extended bit of the feature mask page 0, the feature mask page 1, or the feature mask page 2 is used to indicate a polar encoding scheme support feature of a Bluetooth node; or the extended feature mask table is a feature mask page 3, and the feature mask page 3 is used to indicate a polar encoding scheme support feature of a Bluetooth node.

In the foregoing implementations, the sending unit 1200 and the receiving unit 1300 may be alternatively integrated into one transceiver unit that has both a receiving function and a sending function. This is not limited in embodiments of the present disclosure.

Optionally, in an embodiment, the communication apparatus 1000 may be the first Bluetooth node (in other words, a transmit end in Bluetooth communication) in the method embodiments. In this case, the sending unit 1200 may be a transmitter, and the receiving unit 1300 may be a receiver. The receiver and the transmitter may be alternatively integrated into one transceiver.

Optionally, in another example, the communication apparatus 1000 may be a chip or an integrated circuit mounted in the first Bluetooth node. In this case, the sending unit 1200 and the receiving unit 1300 may be communication interfaces or interface circuits. For example, the sending unit 1200 is an output interface or an output circuit, and the receiving unit 1300 is an input interface or an input circuit.

In the examples, the processing unit 1100 is configured to perform processing and/or operations implemented inside the first Bluetooth node other than a sending or receiving action, for example, determining an encoding scheme of a payload, perform polar encoding on the payload, and performing polar encoding on a payload header.

Optionally, the processing unit 1100 may be a processing apparatus. A function of the processing apparatus may be implemented by hardware, or may be implemented by hardware executing corresponding software.

For example, the processing apparatus may include at least one processor and at least one memory. The at least one memory is configured to store a computer program. The at least one processor reads and executes the computer program stored in the at least one memory, so that the communication apparatus 1000 performs the operations and/or the processing performed by the first Bluetooth node in the method embodiments.

Optionally, the processing apparatus may include only a processor, and a memory configured to store a computer program is located outside the processing apparatus. The processor is connected to the memory by using a circuit or a wire, to read and execute the computer program stored in the memory.

In some examples, the processing apparatus may be alternatively a chip or an integrated circuit.

For example, the processing apparatus includes a processing circuit or a logic circuit and an interface circuit. The interface circuit is configured to receive a bit stream of a to-be-sent payload, and transmit the bit stream of the to-be-sent payload to the processing circuit. The processing circuit performs the operations and/or the processing performed by the first Bluetooth node in the method embodiments: determining an encoding scheme, and when the determined encoding scheme is polar encoding, performing polar encoding on the bit stream of the payload to obtain an extended Bluetooth data packet. The interface circuit is further configured to output the extended Bluetooth data packet.

Figure 20:
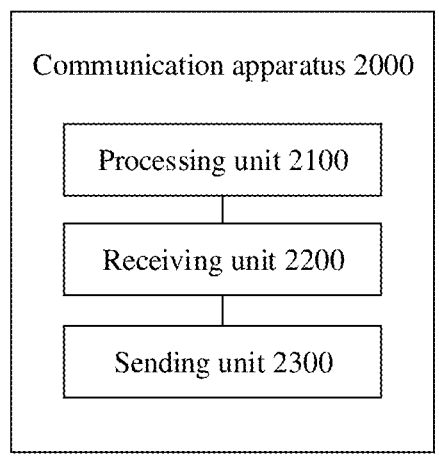
FIG. 20 is a schematic block diagram of another communication apparatus according to an embodiment of the present disclosure.

FIG. 20 is a schematic block diagram of another communication apparatus according to an embodiment of the present disclosure. As shown in FIG. 20, the communication apparatus 2000 includes a processing unit 2100, a receiving unit 2200, and a sending unit 2300.

The receiving unit 2200 is configured to receive an extended Bluetooth data packet from a first Bluetooth node, where the extended Bluetooth data packet is encoded by using a polar encoding scheme.

The processing unit 2100 is configured to decode the extended Bluetooth data packet by using a polar code decoding method corresponding to the polar encoding, to obtain a payload of the extended Bluetooth data packet.

Optionally, in an embodiment, the extended Bluetooth baseband protocol is an extended BR baseband protocol or an extended EDR baseband protocol, where in the extended BR baseband protocol or the extended EDR baseband protocol, the extended Bluetooth data packet includes a data packet header and the payload, the data packet header includes a type field, and the type field is used to indicate an encoding scheme of the payload; and the processing unit 2100 is configured to:
decode the packet header of the extended Bluetooth data packet to obtain the type field, and determine, based on the type field, that the polar encoding scheme is used for the extended Bluetooth data packet.

Optionally, in an embodiment, the extended Bluetooth data packet includes one or more of:
an HV3 data packet of an SCO logical link;
an EV3 data packet and an EV5 data packet of an eSCO logical link;
a 2-EV3 data packet, a 2-EV5 data packet, a 3-EV3 data packet, and a 3-EV5 data packet of the eSCO logical link; or
a DH1 data packet, a DH3 data packet, and a DH5 data packet of an ACL logical link.

Optionally, in an embodiment, if a type of the extended Bluetooth data packet is a data packet of the eSCO logical link, a length and/or a bit rate of the extended Bluetooth data packet are determined through negotiation when the first Bluetooth node and the communication apparatus establish the eSCO logical link.

Optionally, in an embodiment, if a type of the extended Bluetooth data packet is a data packet of the ACL logical link, LMP signaling used for feature negotiation between the first Bluetooth node and the communication apparatus includes a packet type mapping parameter. The packet type mapping parameter is used to negotiate upon the type of the extended Bluetooth data packet transmitted on the ACL logical link.

Optionally, in an embodiment, the packet type mapping parameter includes a first extended value and/or a second extended value. The first extended value is used to indicate that the extended Bluetooth data packet transmitted on the ACL logical link is a Bluetooth data packet based on the extended BR baseband protocol. The second extended value is used to indicate that the extended Bluetooth data packet transmitted on the ACL logical link is a Bluetooth data packet based on the extended EDR baseband protocol.

Optionally, in an embodiment, a payload of the extended Bluetooth data packet transmitted on the ACL logical link includes a payload header and payload data, and the processing unit 2100 is further configured to:
the second Bluetooth node perform polar decoding on the payload header by using a fixed bit rate to obtain the length and/or the bit rate of the payload data, and decode the payload data based on the length and/or the bit rate of the payload data.

Optionally, in an embodiment, the extended Bluetooth baseband protocol is an extended low energy (LE) baseband protocol, where in the extended LE baseband protocol, the extended Bluetooth data packet includes a preamble, a first FEC block, and a second FEC block, the first FEC block includes a coding indicator (CI) field, the second FEC block includes the payload, and an extended value of the CI field is used to indicate the polar encoding scheme of the second FEC block; and the processing unit 2100 is configured to:
decode the CI field of the first FEC block, and determine, based on the CI field, that the polar encoding scheme is used for the extended Bluetooth data packet.

Optionally, in an embodiment, the CI field includes a third extended value and/or a fourth extended value, where the third extended value is used to indicate that an encoding scheme with S=8 and the polar encoding scheme are used for the second FEC block, and the fourth extended value is used to indicate that an encoding scheme with S=2 and the polar encoding scheme are used for the second FEC block.

Optionally, in an embodiment, a payload of the second FEC block includes a payload header and payload data, where the payload header is used to indicate a length and/or a bit rate of the payload data; and
the processing unit 2100 is further configured to:
perform polar decoding on the payload header by using a fixed bit rate to obtain the length and/or the bit rate of the payload data, and decode the payload data based on the length and/or the bit rate of the payload data.

Optionally, in an embodiment, the payload header includes a first length field and a second length field, where
the first length field is used to indicate an original information length of the second FEC block, the second length field is used to indicate a length of an encoded second FEC block, and the original information length of the second FEC block does not include a length of the payload header; or
the first length field is used to indicate a bit rate of the second FEC block, and the second length field is used to indicate a length of an encoded second FEC block.

Optionally, in an embodiment, the extended Bluetooth data packet is a data packet, based on the extended LE baseband protocol, of an advertising physical channel or a data physical channel.

Optionally, in an embodiment, the receiving unit 2200 is further configured to:
receive a first LMP message from the first Bluetooth node, where the first LMP message is used to request to perform feature exchange with the communication apparatus, and the first LMP message carries a polar encoding scheme support feature of the first Bluetooth node; and the sending unit 2300 is configured to:

send, to the first Bluetooth node, a second LMP message used to respond to the first LMP message, where the second LMP message carries a polar encoding scheme support feature of the communication apparatus, so that the first Bluetooth node obtains, based on the second LMP message, the polar encoding scheme support feature of the communication apparatus.

Optionally, in an embodiment, the receiving unit 2200 is configured to:

when the first Bluetooth node supports the polar encoding scheme and the communication apparatus supports the polar encoding scheme, receive the extended Bluetooth data packet from the first Bluetooth node.

Optionally, in an embodiment, the extended Bluetooth baseband protocol includes an extended feature mask table, and the extended feature mask table includes one of the following cases: the extended feature mask table is a feature mask page 0, a feature mask page 1, or a feature mask page 2, and a reserved bit or an extended bit of the feature mask page 0, the feature mask page 1, or the feature mask page 2 is used to indicate a polar encoding scheme support feature of a Bluetooth node; or the extended feature mask table is a feature mask page 3, and the feature mask page 3 is used to indicate a polar encoding scheme support feature of a Bluetooth node.

In the foregoing implementations, the receiving unit 2200 and the sending unit 2300 may be alternatively integrated into one transceiver unit that has both a receiving function and a sending function. This is not limited in embodiments of the present disclosure.

Optionally, in an example, the communication apparatus 2000 may be the second Bluetooth node (in other words, a receive end in Bluetooth communication) in the method embodiments. In this case, the receiving unit 2200 may be a receiver, and the sending unit 2300 may be a transmitter. The receiver and the transmitter may be alternatively integrated into one transceiver.

Optionally, in another example, the communication apparatus 2000 may be a chip or an integrated circuit mounted in the second Bluetooth node. In this case, the receiving unit 2200 and the sending unit 2300 may be communication interfaces or interface circuits. For example, the receiving unit 2200 is an input interface or an input circuit, and the sending unit 2300 is an output interface or an output circuit.

In the examples, the processing unit 2100 is configured to perform processing and/or operations implemented inside the second Bluetooth node other than a sending or receiving action, for example, decode an extended Bluetooth data packet by using a polar code decoding method to obtain a payload, and decoding a payload header of the extended Bluetooth data packet by using the polar code decoding method.

Optionally, the processing unit 2100 may be a processing apparatus. A function of the processing apparatus may be implemented by hardware, or may be implemented by hardware executing corresponding software.

For example, the processing apparatus may include at least one processor and at least one memory. The at least one memory is configured to store a computer program. The at least one processor reads and executes the computer program stored in the at least one memory, so that the communication apparatus 2000 performs the operations and/or the processing performed by the second Bluetooth node in the method embodiments.

Optionally, the processing apparatus may include only a processor, and a memory configured to store a computer program is located outside the processing apparatus. The processor is connected to the memory by using a circuit or a wire, to read and execute the computer program stored in the memory.

Optionally, in some examples, the processing apparatus may be alternatively a chip or an integrated circuit. For example, the processing apparatus includes a processing circuit or a logic circuit and an interface circuit. The interface circuit is configured to receive an extended Bluetooth data packet, and transmit the extended Bluetooth data packet to the processing circuit. The processing circuit decodes the extended Bluetooth data packet to obtain a payload. The interface circuit is further configured to output the payload.

Figure 21:
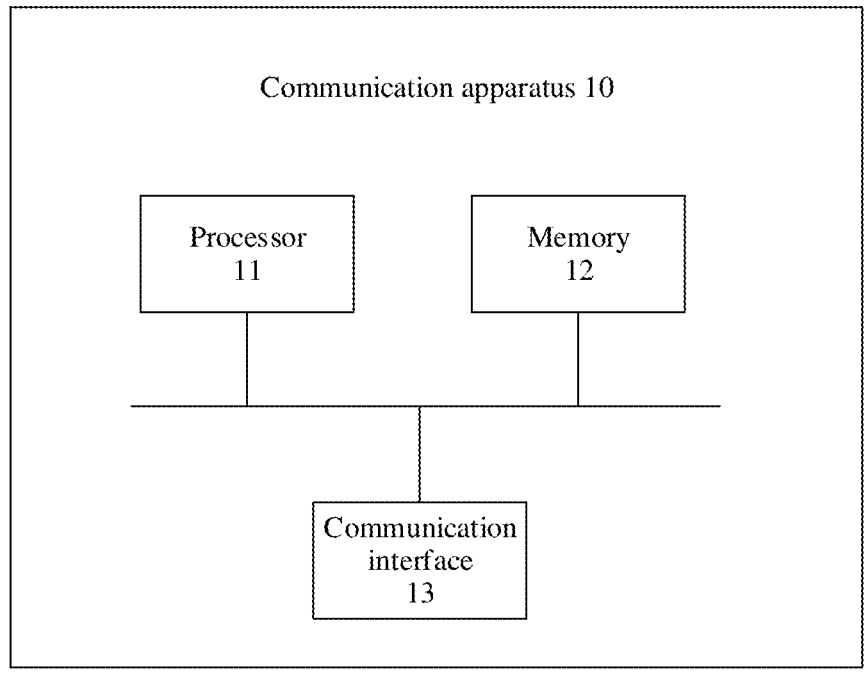
FIG. 21 is a schematic diagram of a structure of a communication apparatus according to an embodiment of the present disclosure.

FIG. 21 is a schematic diagram of a structure of a communication apparatus according to an embodiment of the present disclosure. As shown in FIG. 21, the communication apparatus 10 includes one or more processors 11, one or more memories 12, and one or more communication interfaces 13. The one or more processors 11 are configured to control the one or more communication interfaces 13 to send or receive a signal. The one or more memories 12 are configured to store a computer program. The one or more processors 11 are configured to invoke the computer program from the one or more memories 12 and run the computer program, so that the communication apparatus 10 performs the processes and/or the operations performed by the first Bluetooth node in the method embodiments of the present disclosure.

For example, the one or more processors 11 may have a function of the processing unit 1100 shown in FIG. 19, and the one or more communication interfaces 13 may have a function of the sending unit 1200 and/or the receiving unit 1300 shown in FIG. 19. The one or more processors 11 may be configured to perform the processing or the operations performed by the first Bluetooth node in FIG. 1 to FIG. 17, and the one or more communication interfaces 13 are configured to perform the sending action and/or the receiving action performed by the first Bluetooth node in FIG. 1 to FIG. 17.

In an implementation, the communication apparatus 10 may be the first Bluetooth node in the method embodiments. In this implementation, the one or more communication interfaces 13 may be a transceiver. The transceiver may include a receiver and a transmitter. Optionally, each of the one or more processors 11 may be a baseband apparatus, and the one or more communication interfaces 13 may be a radio frequency apparatus. In another implementation, the communication apparatus 10 may be a chip or an integrated circuit mounted in the first Bluetooth node. In this implementation, the one or more communication interfaces 13 may be an interface circuit or an input/output interface.

Figure 22:
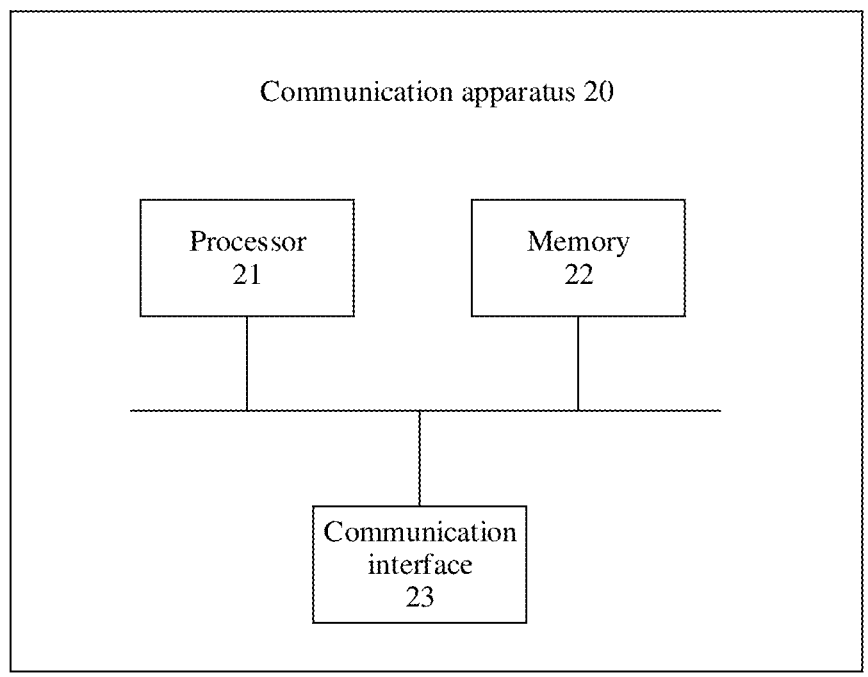
FIG. 22 is a schematic diagram of a structure of another communication apparatus according to an embodiment of the present disclosure.

FIG. 22 is a schematic diagram of a structure of another communication apparatus according to an embodiment of the present disclosure. As shown in FIG. 22, the communication apparatus 20 includes one or more processors 21, one or more memories 22, and one or more communication interfaces 23. The one or more processors 21 are configured to control the one or more communication interfaces 23 to send or receive a signal. The one or more memories 22 are configured to store a computer program. The one or more processors 21 are configured to invoke the computer program from the one or more memories 22 and run the computer program, so that the communication apparatus 20 performs the processes and/or the operations performed by the second Bluetooth node in the method embodiments of the present disclosure.

For example, the one or more processors 21 may have a function of the processing unit 2100 shown in FIG. 20, and the one or more communication interfaces 23 may have a function of the receiving unit 2200 and/or the sending unit 2300 shown in FIG. 20. The one or more processors 21 may be configured to perform the processing or the operations performed by the second Bluetooth node in FIG. 1 to FIG. 17, and the one or more communication interfaces 33 are configured to perform the sending action and/or the receiving action performed by the second Bluetooth node in FIG. 1 to FIG. 17.

In an implementation, the communication apparatus 20 may be the second Bluetooth node in the method embodiments. In this implementation, the communication interface 23 may be a transceiver. The transceiver may include a receiver and a transmitter. Optionally, each of the one or more processors 21 may be a baseband apparatus, and the one or more communication interfaces 23 may be a radio frequency apparatus. In another implementation, the communication apparatus 20 may be a chip or an integrated circuit mounted in the second Bluetooth node. In this implementation, the communication interface 23 may be an interface circuit or an input/output interface.

Optionally, the memory and the processor in the foregoing apparatus embodiments may be physically independent units, or the memory and the processor may be integrated together. This is not limited in embodiments of the present disclosure.

In addition, the present disclosure further provides an example computer-readable storage medium. The computer-readable storage medium stores computer instructions. When the computer instructions are run on a computer, the operations and/or the processes performed by the first Bluetooth node in the method embodiments of the present disclosure are performed.

The present disclosure further provides an example computer-readable storage medium. The computer-readable storage medium stores computer instructions. When the computer instructions are run on a computer, the operations and/or the processes performed by the second Bluetooth node in the method embodiments of the present disclosure are performed.

In addition, the present disclosure further provides an example computer program product. The computer program product includes computer program code or instructions. When the computer program code or the instructions are run on a computer, the operations and/or the processes performed by the first Bluetooth node in the method embodiments of the present disclosure are performed.

The present disclosure further provides an example computer program product. The computer program product includes computer program code or instructions. When the computer program code or the instructions are run on a computer, the operations and/or the processes performed by the second Bluetooth node in the method embodiments of the present disclosure are performed.

In addition, the present disclosure further provides an example chip. The chip includes a processor. A memory configured to store a computer program is disposed separately from the chip. The processor is configured to execute the computer program stored in the memory, so that a Bluetooth node in which the chip is mounted performs the operations and/or the processing performed by the first Bluetooth node in any method embodiment.

Further, the chip may further include a communication interface. The communication interface may be an input/output interface, an interface circuit, or the like. Further, the chip may further include the memory.

The present disclosure further provides an example chip. The chip includes a processor. A memory configured to store a computer program is disposed separately from the chip. The processor is configured to execute the computer program stored in the memory, so that a Bluetooth node in which the chip is mounted performs the operations and/or the processing performed by the second Bluetooth node in any method embodiment.

Further, the chip may further include a communication interface. The communication interface may be an input/output interface, an interface circuit, or the like. Further, the chip may further include the memory.

In addition, the present disclosure further provides an example communication apparatus (which may be, for example, a chip), including a processor and a communication interface. The communication interface is configured to receive a signal and transmit the signal to the processor. The processor processes the signal, so that the operations and/or the processing performed by the first Bluetooth node in any method embodiment are performed.

When the communication apparatus is a chip, the chip is configured to generate the extended Bluetooth data packet in embodiments of the present disclosure, and a communication apparatus in which the chip is mounted can be enabled to perform the operations and/or the processing performed by the first Bluetooth node in embodiments of the present disclosure.

The present disclosure further provides an example communication apparatus (which may be, for example, a chip), including a processor and a communication interface. The communication interface is configured to receive a signal and transmit the signal to the processor. The processor processes the signal, so that the operations and/or the processing performed by the second Bluetooth node in any method embodiment are performed.

When the communication apparatus is a chip, the chip is configured to decode the received extended Bluetooth data packet in embodiments of the present disclosure by using a polar code decoding method, and a communication apparatus in which the chip is mounted can be enabled to perform the operations and/or the processing performed by the second Bluetooth node in embodiments of the present disclosure.

In addition, the present disclosure further provides an example communication apparatus, including at least one processor. The at least one processor is coupled to at least one memory. The at least one processor is configured to execute a computer program or instructions stored in the at least one memory, so that the operations and/or the processing performed by the first Bluetooth node in any method embodiment are performed.

The present disclosure further provides an example communication apparatus, including at least one processor. The at least one processor is coupled to at least one memory. The at least one processor is configured to execute a computer program or instructions stored in the at least one memory, so that the operations and/or the processing performed by the second Bluetooth node in any method embodiment are performed.

Optionally, the at least one processor and the at least one memory are integrated together.

In addition, the present disclosure further provides an example communication device, including a processor, a memory, and a transceiver. The memory is configured to store a computer program. The processor is configured to invoke the computer program stored in the memory and run the computer program, and control the transceiver to send or receive a signal, so that the communication device performs the operations and/or the processing performed by the first Bluetooth node in any method embodiment.

The present disclosure further provides an example communication device, including a processor, a memory, and a transceiver. The memory is configured to store a computer program. The processor is configured to invoke the computer program stored in the memory and run the computer program, and control the transceiver to send or receive a signal, so that the communication device performs the operations and/or the processing performed by the second Bluetooth node in any method embodiment.

In addition, the present disclosure further provides an example wireless communication system, including the first Bluetooth node and/or the second Bluetooth node in embodiments of the present disclosure.

Optionally, the first Bluetooth node is a transmit end in Bluetooth communication, and the second Bluetooth node is a receive end in Bluetooth communication.

The processor in embodiments of the present disclosure may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the methods disclosed in embodiments of the present disclosure may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the embodiments of the present disclosure may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, RAMs in many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory in the system and the method described in this specification is intended to include, but not limited to, these memories and any memory of another proper type.

A person of ordinary skill in the art may be aware that, in combination with the examples described in embodiments disclosed in this specification, units and algorithm steps be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in the present disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of the present disclosure may be integrated into one processing unit, or each of the units may exist alone physically, or two or more units may be integrated into one unit.

The term "and/or" in the present disclosure describes only an association relationship for describing associated objects and represents that any of the three relationships may exist. For example, A and/or B may represent any of the following three cases: Only A exists, both A and B exist, or only B exists. A, B, and C each may be singular or plural. This is not limited in embodiments of the present disclosure.

When the functions are implemented in the form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure.

The foregoing descriptions are merely non-limiting examples of specific implementations, and are not intended to limit the protection scope, which is intended to cover any variation or replacement readily determined by a person skilled in the art. Therefore, the claims shall define the protection scope.

What is claimed is:

1. A method for processing a Bluetooth data packet, comprising:
   obtaining, by a first Bluetooth node, a bit stream of a to-be-sent payload;
   determining, by the first Bluetooth node, an encoding scheme, wherein the encoding scheme is polar encoding or standard Bluetooth encoding;
   when the determined encoding scheme is the polar encoding, performing, by the first Bluetooth node, polar encoding on the bit stream of the payload according to an extended Bluetooth baseband protocol, to obtain an extended Bluetooth data packet, wherein the extended Bluetooth baseband protocol supports the polar encoding; and
   sending, by the first Bluetooth node, the extended Bluetooth data packet to a second Bluetooth node that has established a Bluetooth connection with the first Bluetooth node,
   wherein the extended Bluetooth baseband protocol is an extended basic rate (BR) baseband protocol, an enhanced data rate (EDR) baseband protocol, or an extended low energy (LE) baseband protocol,
   wherein, in the extended BR baseband protocol or the extended EDR baseband protocol, the extended Bluetooth data packet comprises a data packet header and the payload, the data packet header comprising a type field indicating an encoding scheme of the payload;
   wherein, in the extended LE baseband protocol, the extended Bluetooth data packet comprises a preamble, a first forward error correction (FEC) block, and a second FEC block, the first FEC block comprising a coding indicator (CI) field, the second FEC block comprising the payload, and an extended value of the CI field indicating that the polar encoding scheme is used for the second FEC block; and
   wherein the CI field comprises at least one of a third extended value or a fourth extended value, wherein S is a parameter representing a number of symbols used to represent one bit, the third extended value indicates that an encoding scheme with S being equal to 8 and the polar encoding scheme are used for the second FEC block, and the fourth extended value indicates that an encoding scheme with S being equal to 2 and the polar encoding scheme are used for the second FEC block.

2. The method according to claim 1, wherein the extended Bluetooth data packet comprises one or more of:
   an HV3 data packet of a synchronous connection-oriented (SCO) logical link;
   an EV3 data packet and an EV5 data packet of an extended SCO (eSCO) logical link;
   a 2-EV3 data packet, a 2-EV5 data packet, a 3-EV3 data packet, and a 3-EV5 data packet of the eSCO logical link; or
   a DH1 data packet, a DH3 data packet, and a DH5 data packet of an asynchronous connection-oriented (ACL) logical link.

3. The method according to claim 2, wherein when a type of the extended Bluetooth data packet is a data packet of the eSCO logical link, at least one of a length or a bit rate of the extended Bluetooth data packet are determined through negotiation between the first Bluetooth node and the second Bluetooth node during a process of establishing the eSCO logical link between the first Bluetooth node and the second Bluetooth node.

4. The method according to claim 2, wherein when a type of the extended Bluetooth data packet is a data packet of the ACL logical link, link management protocol (LMP) signaling used for feature negotiation between the first Bluetooth node and the second Bluetooth node comprises a packet type mapping parameter used to negotiate upon the type of the extended Bluetooth data packet transmitted on the ACL logical link.

5. The method according to claim 4, wherein the packet type mapping parameter comprises at least one of a first extended value or a second extended value, the first extended value indicates that the extended Bluetooth data packet transmitted on the ACL logical link is a Bluetooth data packet based on the extended BR baseband protocol, and the second extended value indicates that the extended Bluetooth data packet transmitted on the ACL logical link is a Bluetooth data packet based on the extended EDR baseband protocol.

6. The method according to claim 4, wherein a payload of the extended Bluetooth data packet transmitted on the ACL logical link comprises a payload header and payload data, wherein the payload header is encoded by using a polar encoding scheme with a fixed bit rate, and the payload header indicates at least one of a length or a bit rate of the payload data.

7. The method according to claim 1, wherein a payload of the second FEC block comprises a payload header and payload data, wherein polar encoding with a fixed bit rate is performed on the payload header, and the payload header indicates at least one of a length or a bit rate of the payload data.

8. A communication apparatus, comprising:
   at least one processor, and at least one non-transitory memory storing computer instructions that, when executed by the at least one processor, enable the communication apparatus to:
   obtain a bit stream of a to-be-sent payload;
   determine an encoding scheme, wherein the encoding scheme is polar encoding or standard Bluetooth encoding; and
   when the determined encoding scheme is the polar encoding, perform polar encoding on the bit stream of the payload according to an extended Bluetooth baseband protocol, to obtain an extended Bluetooth data packet, wherein the extended Bluetooth baseband protocol supports the polar encoding; and
   send the extended Bluetooth data packet to a Bluetooth node that has established a Bluetooth connection with the communication apparatus,
   wherein the extended Bluetooth baseband protocol is an extended basic rate (BR) baseband protocol, an extended enhanced data rate (EDR) baseband protocol, or an extended low energy (LE) baseband protocol;
   wherein, in the extended BR baseband protocol or the extended EDR baseband protocol, the extended Bluetooth data packet comprises a data packet header and the payload, the data packet header comprising a type field indicating an encoding scheme of the payload;
   wherein, in the extended LE baseband protocol, the extended Bluetooth data packet comprises a preamble, a first forward error correction (FEC) block, and a second FEC block, the first FEC block comprising a coding indicator (CI) field, the second FEC block comprising the payload, and an extended value of the CI field indicating that the polar encoding scheme is used for the second FEC block; and wherein the CI field comprises at least one of a third extended value or a fourth extended value, wherein S is a parameter representing a number of symbols used to represent one bit, the third extended value indicates that an encoding scheme with S being equal to 8 and the polar encoding scheme are used for the second FEC block, and the fourth extended value indicates that an encoding scheme with S being equal to 2 and the polar encoding scheme are used for the second FEC block.

9. The communication apparatus according to claim 8, wherein the extended Bluetooth data packet comprises one or more of:
- an HV3 data packet of a synchronous connection-oriented (SCO) logical link;
- an EV3 data packet and an EV5 data packet of an extended SCO (eSCO) logical link;
- a 2-EV3 data packet, a 2-EV5 data packet, a 3-EV3 data packet, and a 3-EV5 data packet of the eSCO logical link; or
- a DH1 data packet, a DH3 data packet, and a DH5 data packet of an asynchronous connection-oriented (ACL) logical link.

10. The communication apparatus according to claim 9, wherein when a type of the extended Bluetooth data packet is a data packet of the eSCO logical link, at least one of a length or a bit rate of the extended Bluetooth data packet is determined through negotiation between the communication apparatus and the Bluetooth node during a process of establishing the eSCO logical link between the communication apparatus and the Bluetooth node.

11. The communication apparatus according to claim 9, wherein when a type of the extended Bluetooth data packet is a data packet of the ACL logical link, link management protocol (LMP) signaling used for feature negotiation between the communication apparatus and the Bluetooth node comprises a packet type mapping parameter, and the packet type mapping parameter is used to negotiate upon the type of the extended Bluetooth data packet transmitted on the ACL logical link.

12. The communication apparatus according to claim 11, wherein the packet type mapping parameter comprises at least one of a first extended value or a second extended value, the first extended value indicates that the extended Bluetooth data packet transmitted on the ACL logical link is a Bluetooth data packet based on the extended BR baseband protocol, and the second extended value indicates that the extended Bluetooth data packet transmitted on the ACL logical link is a Bluetooth data packet based on the extended EDR baseband protocol.

13. The communication apparatus according to claim 10, wherein a payload of the extended Bluetooth data packet transmitted on the ACL logical link comprises a payload header and payload data; and the computer instructions, when executed by the at least one processor, further enable the communication apparatus to:
perform polar encoding on the payload header by using a fixed bit rate, wherein the payload header indicates at least one of a length or a bit rate of the payload data.

14. A method for processing a Bluetooth data packet, comprising:

receiving, by a second Bluetooth node, an extended Bluetooth data packet from a first Bluetooth node, wherein the extended Bluetooth data packet is generated according to an extended Bluetooth baseband protocol that supports polar encoding, the extended Bluetooth baseband protocol being an extended basic rate (BR) baseband protocol, an extended enhanced data rate (EDR) baseband protocol, or an extended low energy (LE) baseband protocol; and decoding, by the second Bluetooth node, the extended Bluetooth data packet by using a polar code decoding method corresponding to the polar encoding scheme, to obtain a payload of the extended Bluetooth data packet, wherein, in the extended BR baseband protocol or the extended EDR baseband protocol, the extended Bluetooth data packet comprises a data packet-header and the payload, the data packet header comprising a type field indicating an encoding scheme of the payload;

wherein, in the extended LE baseband protocol, the extended Bluetooth data packet comprises a preamble, a first forward error correction (FEC) block, and a second FEC block, the first FEC block comprising a coding indicator (CI) field, the second FEC block comprising the payload, and an extended value of the CI field indicating that the polar encoding scheme is used for the second FEC block; and wherein the CI field comprises at least one of a third extended value or a fourth extended value, wherein S is a parameter representing a number of symbols used to represent one bit, the third extended value indicates that an encoding scheme with S bring equal to 8 and the polar encoding scheme are used for the second FEC block, and the fourth extended value indicates that an encoding scheme with S being equal to 2 and the polar encoding scheme are used for the second FEC block.

* * * * *